(12) United States Patent
Wilkins

(10) Patent No.: US 9,046,126 B2
(45) Date of Patent: Jun. 2, 2015

(54) INTERNAL COMBUSTION ENGINE WITH MECHANICALLY-AFFECTED STROKE

(75) Inventor: Larry C. Wilkins, Ft. Lauderdale, FL (US)

(73) Assignee: Wilkins IP, LLC, New Albany, IN (US)

(*) Notice: Subject to any disclaimer, the term of this patent is extended or adjusted under 35 U.S.C. 154(b) by 419 days.

(21) Appl. No.: 13/323,308

(22) Filed: Dec. 12, 2011

(65) Prior Publication Data

US 2012/0145117 A1 Jun. 14, 2012

Related U.S. Application Data

(60) Provisional application No. 61/422,449, filed on Dec. 13, 2010.

(51) Int. Cl.
*F16C 7/04* (2006.01)
*F16C 7/00* (2006.01)
*F16C 7/06* (2006.01)

(52) U.S. Cl.
CPC ... *F16C 7/04* (2013.01); *F16C 7/00* (2013.01); *F16C 7/06* (2013.01)

(58) Field of Classification Search
CPC ............... F16C 7/00; F16C 7/04; F16C 7/06; F02B 75/045
USPC ..... 123/48 R–48 B, 78 R, 78 B, 78 BA, 78 E, 123/197.3
See application file for complete search history.

(56) References Cited

U.S. PATENT DOCUMENTS

| | | | | | |
|---|---|---|---|---|---|
| 2,074,972 | A | * | 3/1937 | Skinner | 123/193.5 |
| 2,252,153 | A | * | 8/1941 | Anthony | 123/78 E |
| 4,195,601 | A | * | 4/1980 | Crise | 123/78 E |
| 6,202,622 | B1 | * | 3/2001 | Raquiza, Jr. | 123/197.4 |
| 6,467,373 | B1 | * | 10/2002 | El Tahry et al. | 74/579 E |

\* cited by examiner

*Primary Examiner* — Stephen K Cronin
*Assistant Examiner* — Kevin Lathers
(74) *Attorney, Agent, or Firm* — Finnegan, Henderson Farabow, Garrett & Dunner, L.L.P.

(57) ABSTRACT

A connecting rod for an engine may include a sleeve portion having a distal end including a distal aperture configured to be coupled to a piston, and a rod portion having a proximal end including a proximal aperture configured to be coupled to a crankshaft. The rod portion may be configured to reciprocate in the sleeve portion, such that a distance between a center of the proximal aperture and a center of the distal aperture is variable. An engine may include the connecting rod, a power train may include the engine, and a vehicle may include the power train.

56 Claims, 16 Drawing Sheets crankshaft 36 degrees crankshaft 40 degrees

INTERNAL COMBUSTION ENGINE WITH MECHANICALLY-AFFECTED STROKE

RELATED APPLICATION

This application claims the benefit of priority under 35 U.S.C. §119(e) of U.S. Provisional Application No. 61/422,449, filed Dec. 13, 2010, the disclosure of which is incorporated herein by reference.

FIELD OF THE DISCLOSURE

The present disclosure relates to internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston, the cylinder, and a cylinder head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) created between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process may be less than desired.

Thus, it may be desirable to provide an internal combustion engine with a configuration that improves the efficiency of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a connecting rod for an engine. The connecting rod may include a sleeve portion having a distal end including a distal aperture configured to be coupled to a piston, and a rod portion having a proximal end including a proximal aperture configured to be coupled to a crankshaft. The rod portion may be received by the sleeve portion and may be configured to reciprocate in the sleeve portion. The connecting rod may further include a resilient member confined between the rod portion and the sleeve portion. The resilient member may be configured to be compressed and expanded, such that the rod portion reciprocates in the sleeve portion and a distance between a center of the proximal aperture and a center of the distal aperture is variable.

According to another aspect, a connecting rod for an engine may include a sleeve portion having a distal end configured to be coupled to a piston, and a rod portion having a proximal end configured to be coupled to a crankshaft. The rod portion may be received by the sleeve portion and may be configured to reciprocate in the sleeve portion. The rod portion may be configured to rotate about a longitudinal axis with respect to the sleeve portion between a first angular position and a second angular position. When the rod portion is in the first angular position, the connecting rod may have a first length, and when the rod portion is in the second angular position, the connecting rod may have a second length longer than the first length.

According to still a further aspect, a connecting rod for an engine may include a sleeve portion having a distal end configured to be coupled to a piston. The sleeve portion may include first projections. The connecting rod may further include a rod portion having a proximal end configured to be coupled to a crankshaft, the rod portion being received by the sleeve portion and being configured to reciprocate in the sleeve portion. The rod portion may include second projections. When the first and second projections mesh with one another, the connecting rod may have a first length, and when the first and second projections are not meshed with one another, the connecting rod may have a second length longer than the first length.

According to yet another aspect, an internal combustion engine may include a cylinder block defining a cylinder and a crankshaft defining a crankpin. The crankshaft may be rotatably coupled to the cylinder block and may rotate along a longitudinal crankshaft axis. The crankpin may define a longitudinal crankpin axis parallel to and offset by a distance with respect to the longitudinal crankshaft axis. The engine may further include a piston configured to reciprocate within the cylinder, and a connecting rod coupled to the piston and the crankpin. The connecting rod may include a sleeve portion having a distal end coupled to the piston, and a rod portion having a proximal end coupled to the crankpin. The rod portion may be received by the sleeve portion and may be configured to reciprocate in the sleeve portion. The connecting rod may further include a resilient member confined between the rod portion and the sleeve portion. The resilient member may be configured to be compressed and expanded, such that the rod portion reciprocates in the sleeve portion and a distance between a cross-sectional center of the crankpin and an upper surface of the piston is variable.

According to yet a further aspect, an internal combustion engine may include a cylinder block defining a cylinder and a crankshaft defining a crankpin. The crankshaft may be rotatably coupled to the cylinder block and may rotate along a longitudinal crankshaft axis. The crankpin may define a longitudinal crankpin axis parallel to and offset by a distance with respect to the longitudinal crankshaft axis. The engine may further include a piston configured to reciprocate within the cylinder between spaced stroke termination points defining a stroke of the piston. The engine may also include a connecting rod coupled to the piston and the crankpin. The connecting rod may include a sleeve portion having a distal end coupled to the piston, and the sleeve portion may include first projections. The rod portion may have a proximal end coupled to the crankpin, and the rod portion may be received by the sleeve portion and may be configured to reciprocate in the sleeve portion. The rod portion may include second projections. A line extending between the longitudinal crankshaft axis and the longitudinal crankpin axis may define a radial axis of the crankshaft, and the engine may be configured such that as the crankshaft rotates, reversal of the direction of travel of the piston within the cylinder is delayed via operation of the sleeve portion and the rod portion after the piston reaches at least one of the stroke termination points. For example, if the piston would have normally reversed its direction of travel where the radial axis of the crankshaft is at 0 degrees, the piston may (1) reach its stroke termination point with the radial axis at zero degrees and then delay its reversal of direction until a larger moment arm exists between the connecting rod and the longitudinal crankshaft axis, or (2) continue to move in the cylinder in a direction away from the crankshaft, even after the radial axis of the crankshaft has reached 0 degrees and delay its reversal of direction until a larger moment arm exists between the connecting rod and the crankshaft axis.

According to still a further aspect, an internal combustion engine may include a cylinder block defining a cylinder and a crankshaft defining a crankpin. The crankshaft may be rotatably coupled to the cylinder block and may rotate along a longitudinal crankshaft axis. The crankpin may define a longitudinal crankpin axis parallel to and offset by a distance with respect to the longitudinal crankshaft axis. The engine may further include a piston configured to reciprocate within the cylinder between spaced stroke termination points defining a stroke of the piston. The engine may also include a connecting rod coupled to the piston and the crankpin. The connecting rod may include a sleeve portion having a distal end coupled to the piston, and a rod portion having a proximal end coupled to the crankpin. The rod portion may be received by the sleeve portion and may be configured to reciprocate in the sleeve portion. A line extending between the longitudinal crankshaft axis and the longitudinal crankpin axis may define a radial axis of the crankshaft. The connecting rod may be configured such that the rod portion of the connecting rod rotates along a longitudinal axis relative to the sleeve portion based on a radial position of the radial axis of the crankshaft.

According to yet another aspect, a power train may include an engine, a transmission coupled to the engine, and a drive member configured to perform work, with the drive member being coupled to the transmission.

According to still another aspect, a vehicle may include an engine, a transmission coupled to the engine, and a drive member configured to perform work, with the drive member being coupled to the transmission.

Additional optional objects and advantages of the disclosure will be set forth in part in the description which follows, and may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

DESCRIPTION OF EXEMPLARY EMBODIMENTS

Figure 1:
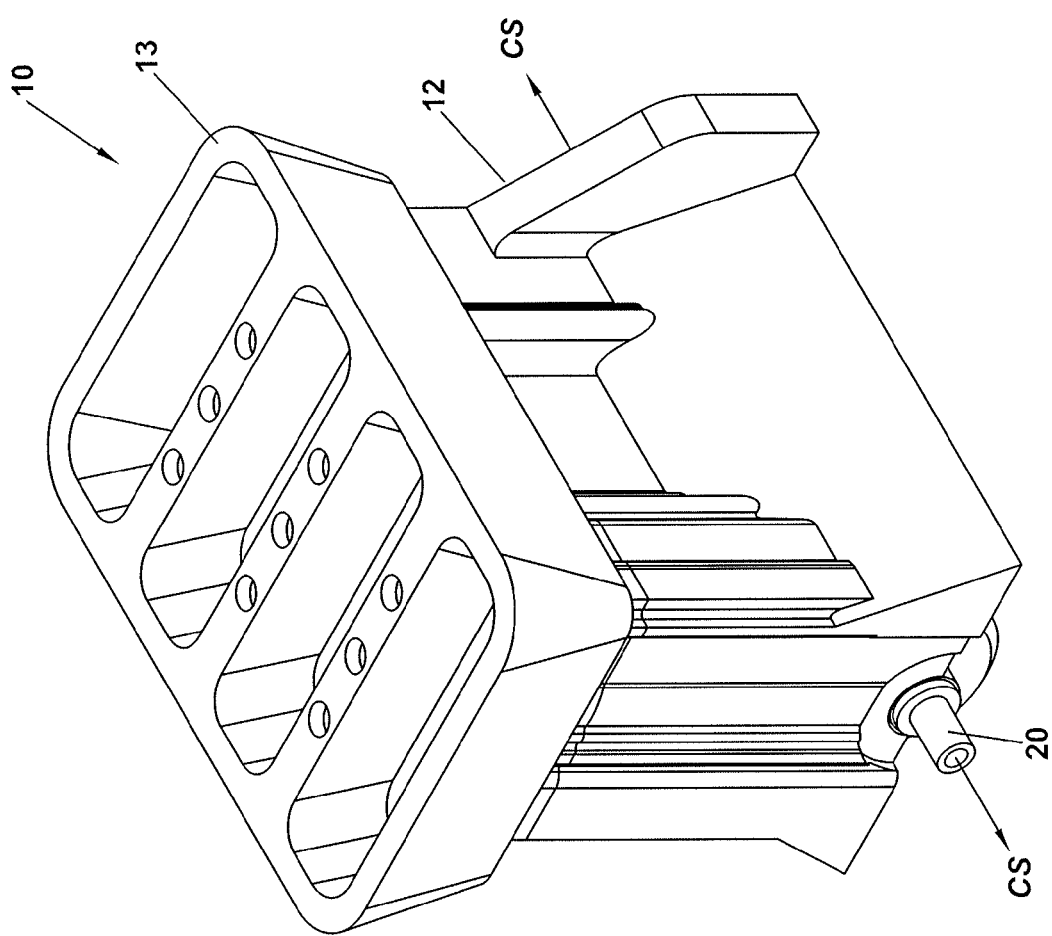
FIG. 1 is a schematic partial perspective view of an exemplary embodiment of an internal combustion engine.

Reference will now be made in detail to exemplary embodiments. Wherever possible, the same reference numbers are used in the drawings and the description to refer to the same or like parts.

FIGS. 1-16 schematically illustrate an exemplary embodiment of engine 10. The exemplary embodiment shown in FIGS. 1-16 includes a connecting rod configured to affect the length of the stroke of engine 10 via mechanical operation.

Figure 2:
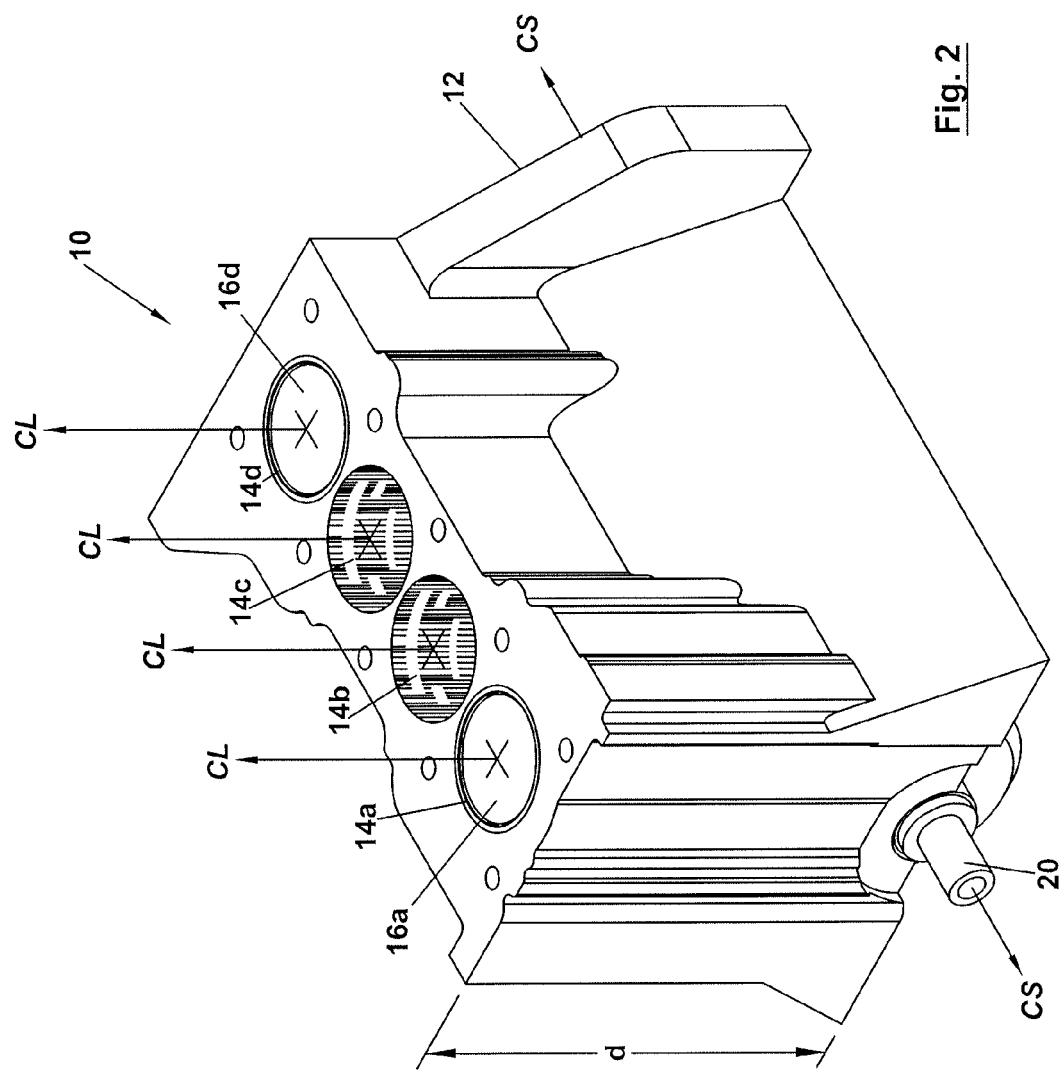
FIG. 2 is a schematic partial perspective view of a portion of the exemplary embodiment shown in FIG. 1.

Exemplary engine 10 shown in FIGS. 1-16 is a reciprocating-piston internal combustion engine. As shown in FIGS. 1 and 2, engine 10 includes a cylinder block 12 and a cylinder head 13. Referring to FIG. 2, cylinder block 12 defines a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "V-6," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 3:
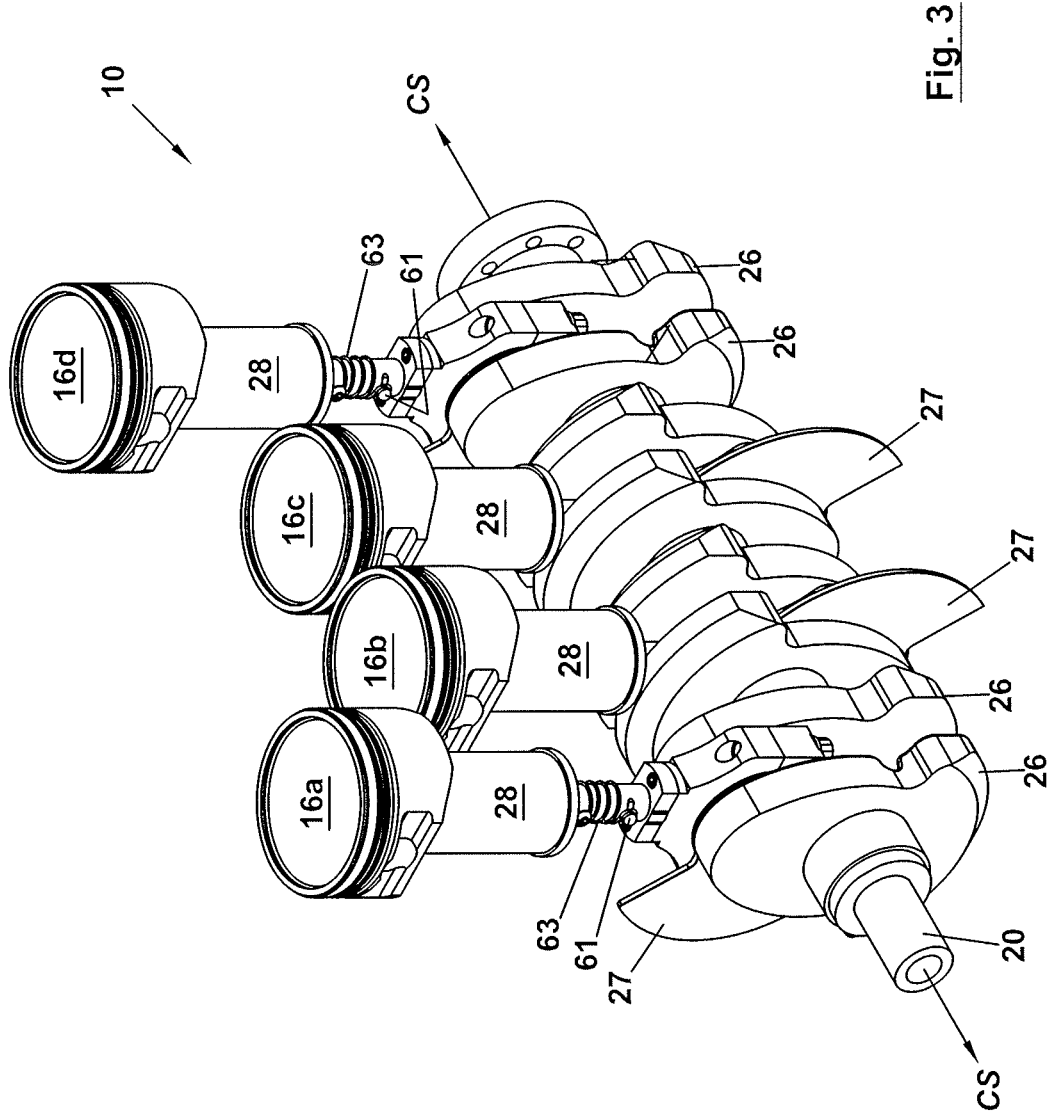
FIG. 3 is a schematic partial perspective view of an exemplary portion of the exemplary embodiment shown in FIG. 1.

As shown in FIGS. 2 and 3, exemplary engine 10 includes pistons 16 corresponding to cylinders 14, for example, four pistons 16a, 16b, 16c, and 16d (FIG. 3). As shown in FIG. 2, pistons 16a and 16d are positioned in the upper end (i.e., "upper" being relative to the orientation of engine 10 shown in FIG. 2) of cylinders 14a and 14d, respectively, while pistons 16b and 16c are not visible in FIG. 2 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIG. 4, crankshaft 20 defines a number of journals 22 corresponding to the number of bearings defined by cylinder block 12, and journals 22 are received by bearings, such that crankshaft 20 may rotate along longitudinal axis CS.

Exemplary crankshaft 20 also defines a number of crankpins 24 corresponding to the number of pistons 16. Crankpins 24 are circular in cross section, and the respective circular cross-sections may define a center C, which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T from the longitudinal axis CS of crankshaft 20. Crankshaft 20 may also include a number of counterbalance weights 26 for providing (or improving) rotational balance of crankshaft 20 when assembled with pistons 16 and connecting rods.

Figure 4:
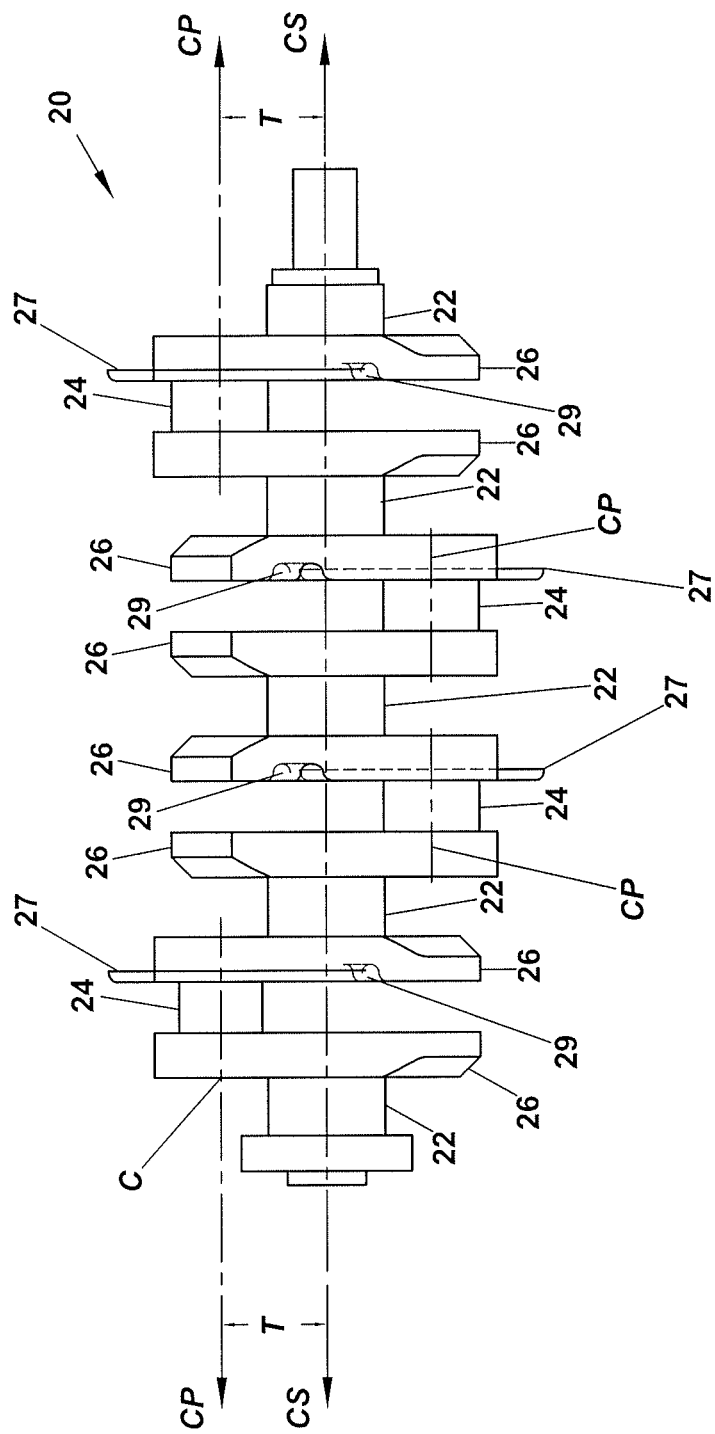
FIG. 4 is a schematic view of an exemplary embodiment of a crankshaft for the exemplary embodiment shown in FIG. 1.
Figure 5:
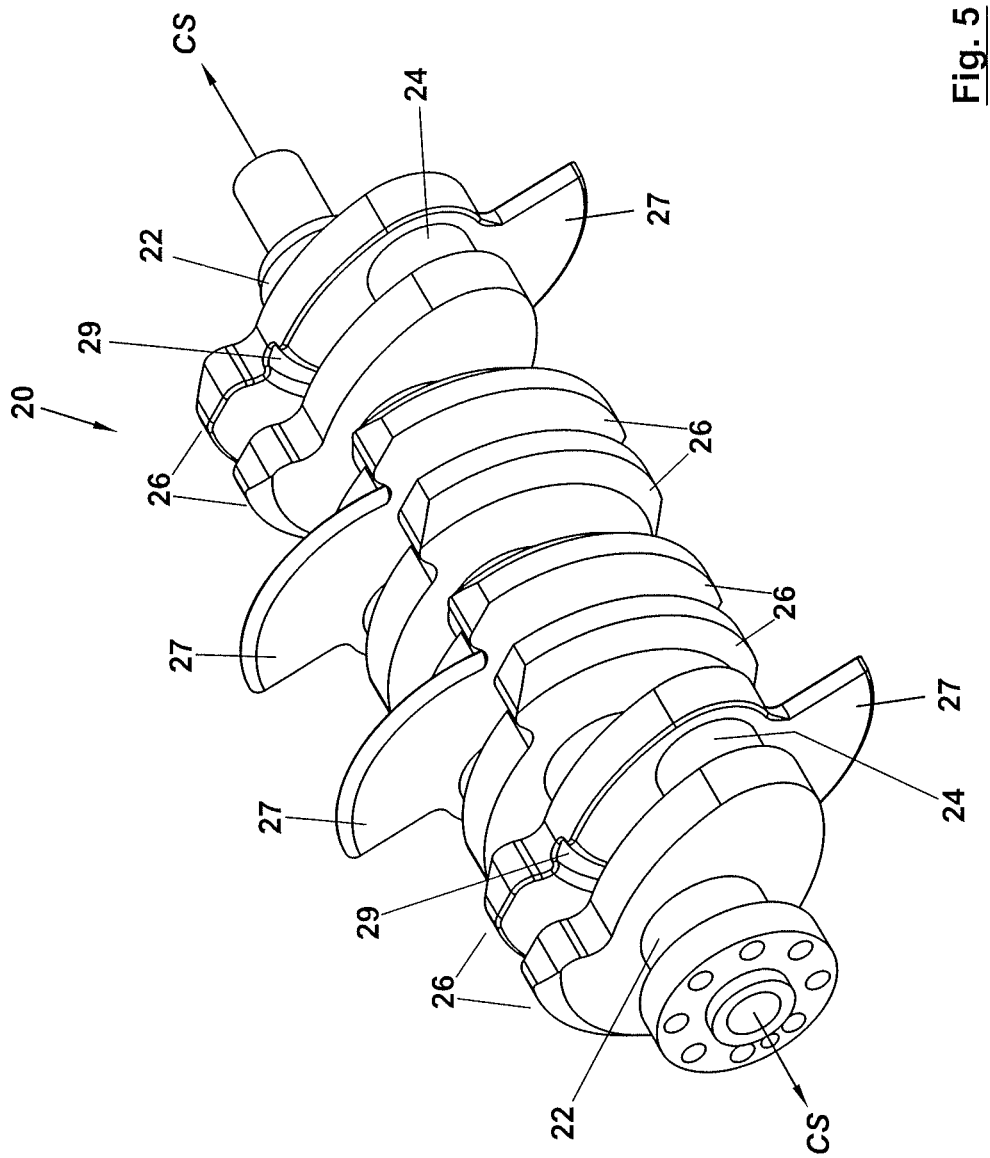
FIG. 5 is a schematic perspective view of the exemplary embodiment shown in FIG. 4.
Figure 6:
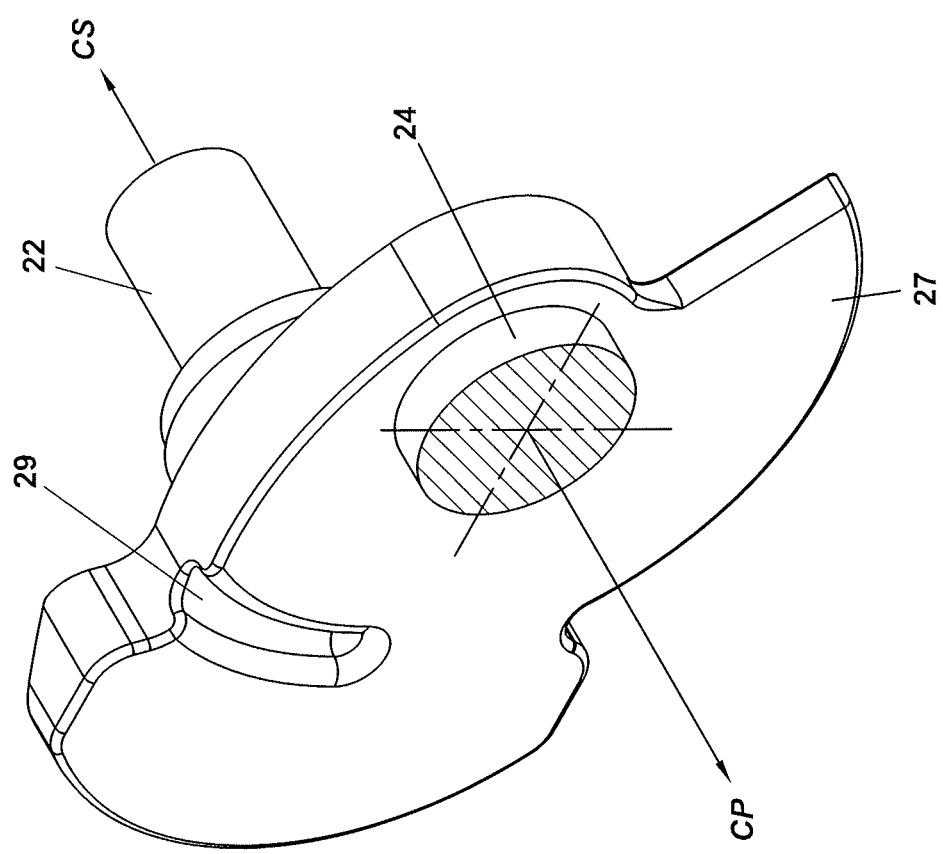
FIG. 6 is a schematic perspective section view of a portion of the exemplary embodiment of crankshaft shown in FIG. 4.
Figure 7:
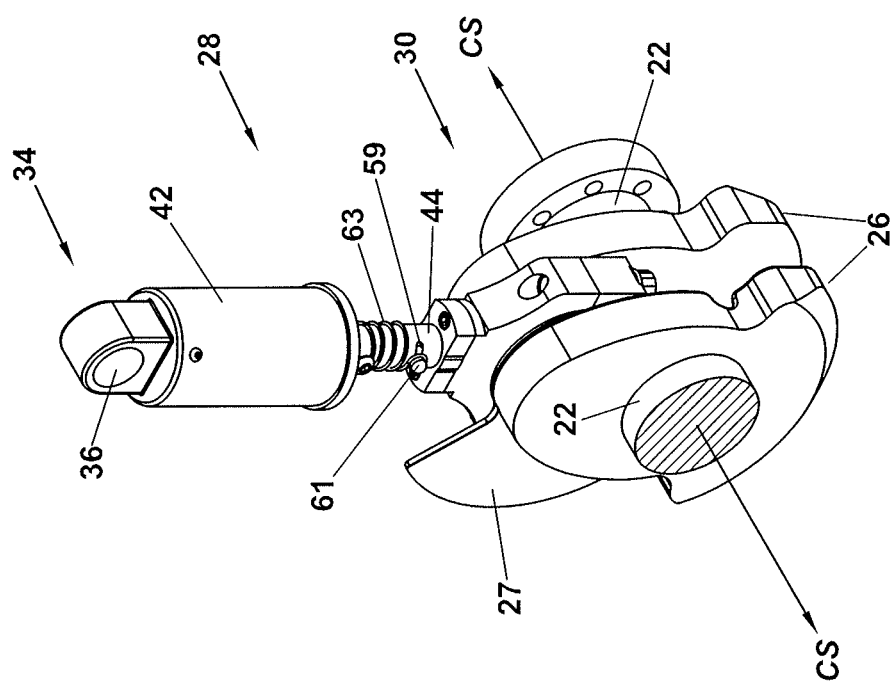
FIG. 7 is a schematic partial perspective view of an exemplary portion of the exemplary embodiment shown in FIG. 1.

Referring to FIGS. 4-6, exemplary crankshaft 20 may include one or more actuating cams 27 configured to engage a follower associated with operation of connecting rod 28, as explained in more detail herein with respect to FIGS. 10-16. For example, as shown in FIGS. 5 and 6, exemplary actuating cams 27 extend from counterbalance weights 26 in the form of, for example, a wing having a greater radial extension than counter balance weights 26. Alternatively, actuating cams 27 may not be formed as part of counterbalance weights 26.

Referring to FIG. 6, counterbalance weights 26 may include a clearance channel 29 in the form of a curved groove. As explained in more detail below with respect to FIGS. 10-16, clearance channel 29 is configured to prevent counterbalance weight 26 from engaging the follower associated with operation of exemplary connecting rod 28.

Referring to FIG. 3, for example, pistons 16 are operably coupled to crankpins 24 via a number of connecting rods 28 corresponding to the number of pistons 16. In particular, exemplary connecting rods 28 (see, e.g., FIGS. 7 and 8B) include a proximal end 30 having a first aperture 32 configured to receive crankpin 24, and a distal end 34 having a second aperture 36 for operably coupling connecting rod 28 to piston 16 via, for example, a pin 38.

According to the exemplary engine 10 shown in FIGS. 1-16, exemplary connecting rod 28 is configured to have a variable length. In particular, exemplary connecting rod 28 defines a longitudinal length L between the center of first aperture 32 and the center of second aperture 36, or a longitudinal length between the center of first aperture 32 and an upper surface of piston 16. In the exemplary embodiment shown, the longitudinal length L of connecting rod 28 may be selectively altered via mechanical operation.

For example, exemplary connecting rod 28 includes a sleeve portion 42 and a rod portion 44. In the example shown in FIGS. 7-8B, rod portion 44 includes proximal end 30 and first aperture 32 (FIG. 10) configured to receive crankpin 24, and sleeve portion 42 includes distal end 34 and second aperture 36 configured to be coupled to piston 16 via pin 38. Rod portion 44 and sleeve portion 42 are configured such that rod portion 44 is able to reciprocate within sleeve portion 42, thereby altering the longitudinal length L between the center of first aperture 32 and the center of second aperture 36, or a longitudinal length between the center of first aperture 32 and an upper surface of piston 16.

Exemplary connecting rod 28 includes an end cap 46 associated with a distal end of sleeve portion 42. For example, end cap 46 is fixed within the distal end of sleeve portion 42 and includes a plurality of projections 48a spaced from one another. Each of projections 48a has an end face 50a, for example, a planar end face, although non-planar end faces are contemplated (see FIG. 8B, which schematically-depicts exemplary end cap 46).

Exemplary rod portion 44 has a distal end including a plunger 47. Exemplary plunger 47 includes a plurality of projections 48b spaced from one another, for example, in a manner similar the projections 48a of end cap 46. Each of projections 48*b* of plunger 47 has an end face 50*b*, for example, a planar end face, although non-planar end faces are contemplated (see FIG. 8B).

As shown, exemplary end cap 46 includes a disc-shaped base 46*a*, and exemplary projections 48*a* extend from base 46*a*, with base 46*a* defining a circular cross-section. Exemplary projections 48*a* define a sector-shaped cross-section arranged in a generally circular shape on base 46*a* (see FIG. 8B). Similarly, exemplary plunger 47 includes a disc-shaped base 47*a*, and exemplary projections 48*b* extend from base 47*a*, with base 47*a* defining a circular cross-section. Exemplary projections 48*b* define a sector-shaped cross-section arranged in a generally circular shape on base 47*a*. As shown in FIG. 8B, exemplary end cap 46 and plunger 47 are configured such that when plunger 47 is in a first angular position with respect to end cap 46, projections 48*a* and 48*b*, which extend toward one another from respective bases 46*a* and 47*a*, mesh with one another such that they extend next to one another in opposite directions, in particular, toward the respective opposing bases 46*a* and 47*a*. This results in connecting rod 28 having a relatively shortened effective length L. On the other hand, when plunger 47 is in a second angular position with respect to end cap 46, such that projections 48*a* and 48*b* are at least partially aligned with one another (see, e.g., FIGS. 12A and 12B), end faces 50*a* and 50*b* abut one another one and hold bases 46*a* and 47*a* apart from one another. This results in connecting rod 28 having a relatively lengthened effective length L.

Exemplary end cap 46 and plunger 47 at least partially define a cavity 52 between projections 48*a* and 48*b* and opposing bases 46*a* and 47*a* (see FIG. 8B). For example, projections 48*a* and 48*b* may define a substantially cylindrical cavity. Cavity 52 expands and at least partially collapses based, in part, on the relative positions of the projections 48*a* and 48*b*. In particular, when projections 48*a* and 48*b* mesh with one another, cavity 52 has a first volume partially defined by a first length between opposing bases 46*a* and 47*a* of end cap 46 and plunger 47. However, when projections 48*a* and 48*b* are positioned such that respective end faces 50*a* and 50*b* abut one another, cavity 52 has a second volume, which is greater than the first volume, partially defined by a second length between opposing faces of end cap 46 and plunger 47.

Exemplary connecting rod 28 includes a resilient member 54 positioned between end cap 46 and plunger 47 and within cavity 52 (see FIG. 8B). Resilient member 54 is configured to be compressed and expanded to return to its pre-compressed dimension. In particular, resilient member 54 is configured to be compressed when projections 48*a* and 48*b* mesh with one another, and cavity 52 has the first volume. When resilient member 54 is in this compressed state, it provides opposing forces on each of the opposing bases 46*a* and 47*a* of end cap 46 and plunger 47. The opposing force tends to push the opposing bases 46*a* and 46*b* apart from one another such that end cap 46 and plunger 47 move away from one another, resulting in projections 48*a* and 48*b* moving from a position in which they mesh with one another to a position in which they do not mesh with one another, for example, such that faces 50*a* and 50*b* clear each other (see FIGS. 11A and 11B).

Exemplary resilient member 54 may include pressurized gas contained within a bladder. For example, the pressurized gas and bladder may be configured such that when compressed and the magnitude of the compression increases, the force acting against the compression by the gas within the bladder increases. Resilient member 54 may include one or more of a gas shock absorber, a spring, and a urethane member. Regardless of its form, resilient member 54 is configured to bias rod portion 44 of connecting rod 28 to an extended position, which corresponds to an increase in the effective length L of connecting rod 28.

During operation of exemplary engine 10, connecting rod 28 is configured to alter its effective length L by virtue of projections 48*a* and 48*b* moving in a controlled manner between a first condition in which projections 48*a* and 48*b* mesh to a second condition in which end faces 50*a* and 50*b* of projections 48*a* and 48*b* abut one another. In the first condition, the effective length L of connecting rod 28 is relatively short, and in the second condition, the effective length L is relatively long. As explained in more detail below, by controlling the effective length L, the stroke of exemplary engine 10 may be affected via mechanical operation.

Figure 10:
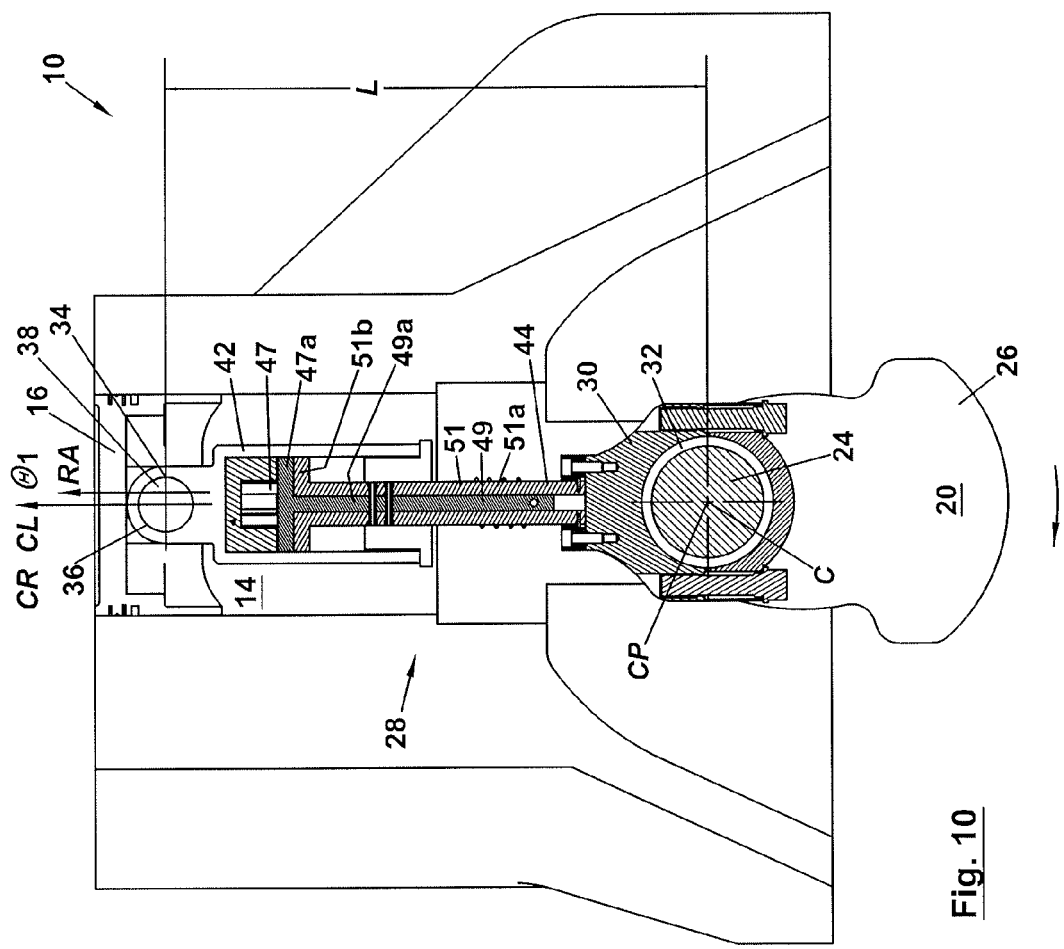
FIG. 10 is a schematic partial end section view of the exemplary embodiment shown in FIG. 1 with the radial axis angle of the crankshaft shown at 0 degrees.

Referring to FIG. 10, rod portion 44 of connecting rod 28 includes an inner portion 49 and an outer portion 51. Outer portion 51 defines a hollow sleeve 51*a*, which terminates in a flange 51*b* having a circular periphery (e.g., creating a disc-like shape). Inner portion 49 includes a stem 49*a*, which terminates in base 47*a* of plunger 47. Stem 49*a* extends through sleeve 51*a*, such that plunger base 47*a* abuts flange 51*b*. Inner portion 49 and outer portion 51 are configured such that stem 49*a* is able to rotate along a longitudinal axis within sleeve 51*a*, with base 47*a* of plunger 47 abutting flange 51*b* (see FIGS. 10 and 12A).

In order to cause rotation of inner portion 49 within outer portion 51, sleeve 51*a* includes a substantially circumferentially-extending slot 59 (see, e.g., FIGS. 7, 8A, 9, and 11B), and stem 49*a* includes a follower 61 in the form of, for example, a pin. Follower 61 extends from stem 49*a* through slot 59 and beyond the cross-sectional periphery of sleeve 51*a*. Slot 59 and follower 61 are configured such that movement of follower 61 within slot 59 results in rotation of inner portion 49 relative to outer portion 51, such that projections 48*a* of end cap 46 and projections 48*b* of plunger 47 can be radially aligned and misaligned in a controllable manner via movement of follower 61. In particular, projections 48*a* and 48*b*, when misaligned can mesh with one another, thereby shortening the effective length L of connecting rod 28 (see, e.g., FIGS. 8A-10). When projections 48*a* and 48*b* are aligned such that end faces 50*a* and 50*b* abut one another, exemplary connecting rod 28 takes on its lengthened effective length L (see, e.g., FIGS. 12A and 12B).

Figures 11A, 11B:
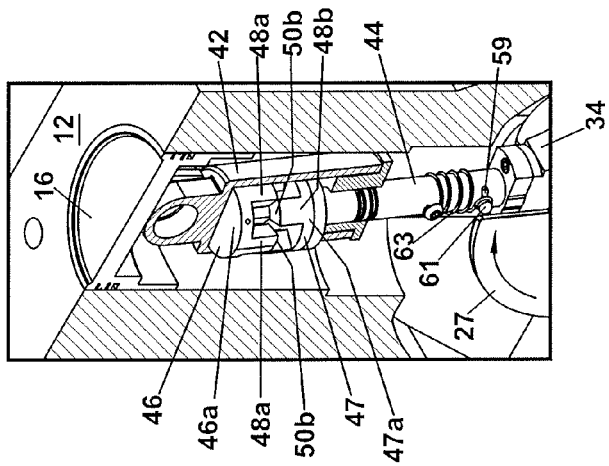
FIG. 11A is a schematic partial end section view of the exemplary embodiment shown in FIG. 1 with the radial axis angle of the crankshaft shown at 36 degrees.
FIG. 11B is a schematic partial perspective detail section view of FIG. 11A.

In the exemplary embodiment shown, a radial biasing member 63 (e.g., a spring) may be provided, such that inner portion 49 and outer portion 51 are biased in relative radial positions with respect to one another, resulting in projections 48*a* and 48*b* being misaligned and meshed. Exemplary resilient member 54 in cavity 52 is configured to bias rod portion 44 of connecting rod 28 to an extended position, which corresponds to an increase in the effective length L of connecting rod 28. In the extended position end faces 50*a* and 50*b* of respective end cap 46 and plunger 47 clear one another, such that projections 48*a* and 48*b* do not mesh or overlap with one another (FIGS. 11A and 11B). In the extended position, rod portion 44 (i.e., plunger 47) is permitted to rotate along a longitudinal axis from a first angular position to a second angular position such that projections 48*a* and 48*b* become partially aligned with one another so that end faces 50*a* and 50*b* overlap one another (see FIGS. 12*a*, 12*b*, and 13). This prevents rod portion 44 from being retracted in sleeve portion 42 until rod portion 44 returns to the first angular position relative to sleeve portion 42.

According to the exemplary embodiment shown, operation of sleeve portion 42 and rod portion 44 can be controlled such that substantial movement of piston 16 toward crankshaft 20 during the power stroke is delayed until crankshaft 20 has rotated to point at which there is a more effective moment arm between connecting rod axis CR and radial axis RA extending between crankshaft axis CS and a respective crankpin axis CP. More specifically, operation of rod portion 44 may be controlled via controlling radial movement of inner portion 49 within outer portion of 51, such that rod portion 44 moves between the first and second angular positions, thereby controlling extension and retraction (reciprocation) of rod portion 44 in sleeve portion 42. Controlling reciprocation of rod portion 44 results in controlling change of the effective length L of connecting rod 28. As a result, a greater amount of the energy of the combustion event may be captured because the maximum force acting on piston 16 may coincide with a greater moment arm, thereby resulting in more torque at crankshaft 20 during the power stroke. Timing of initiation of combustion may be tailored to take advantage of the delayed stroke.

During operation of exemplary engine 10, as crankshaft 20 rotates, crankpins 24 revolve around crankshaft longitudinal axis CS, such that crankpin centers C define a circular path having a radius defined by the distance T defined along a radial axis RA (see FIGS. 8A-16) extending between the longitudinal axis CS of crankshaft 20 and the longitudinal axis CP of the respective crankpins 24. Thus, first apertures 32 of proximal end 30 of connecting rod 28, which are rotatably coupled with respect to crankpins 24, also revolve about the crankshaft axis CS. Distal end 34 of connecting rod 28 is constrained to move in a reciprocating and linear manner due to being operably coupled to piston 16, which is likewise constrained to move in a reciprocating and linear manner within respective cylinder 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS (see FIGS. 4 and 8A), as affected according to the exemplary operation described herein.

During operation of a conventional engine, a piston reciprocates within the cylinder, such that during a power stroke of the internal combustion engine, combustion of an air/fuel mixture within a combustion chamber defined by the piston, cylinder, and cylinder-head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process in a conventional internal combustion engine may be less than desired.

Exemplary engine 10 is configured to employ a strategy that delays substantial movement of piston 16 toward crankshaft 20 during the power stroke, until crankshaft 20 has rotated to a point at which there is a more effective moment arm between connecting rod axis CR and radial axis RA extending between crankshaft axis CS and a respective crankpin axis CP. As a result, a greater amount of the energy of the combustion event may be captured because the maximum force acting on piston 16 coincides with a greater moment arm, thereby resulting in more torque at crankshaft 20 during the power stroke. Timing of the initiation of combustion may be tailored to take advantage of the delayed stroke.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

FIGS. 8A-16 schematically illustrate exemplary operation of engine 10 having exemplary connecting rod 28, which serves to delay the travel of piston 16 at the beginning of the power stroke of exemplary engine 10. In particular, by selectively controlling the reciprocation of rod portion 44 in sleeve portion 42 of connecting rod 28, such that the distance between the center CP of crankpin 24 and the center of pin 38 (i.e., the effective length L of connecting rod 28) may be selectively varied. Such an exemplary embodiment renders it possible to effectively hold piston 16 in cylinder 14 at a substantially fixed position for a short period of time, even as crankpin 24 continues to revolve around crankshaft axis CS as crankshaft 20 rotates. As a result, it is possible to hold piston 16 at the point of highest compression in the combustion chamber while crankpin 24 revolves to a position, which results in an increased moment arm defined by the radial axis RA extending between the center of crankshaft 20 and the center C of crankpin 24 and the axis CR of connecting rod 28. This results in relatively more torque being applied to crankshaft 20 as combustion begins, with piston 16 still remaining at a point farthest from the center of crankshaft 20 (i.e., at the end of its upward stroke as shown). In this exemplary manner, the delaying strategy outlined below may be implemented.

As shown in FIGS. 8A-10, crankshaft 20 is oriented such that radial axis RA defined by the center of crankshaft 20 and the center C of crankpin 24 is oriented at zero degrees, which corresponds generally a first stroke termination angle $\theta_1$ that generally coincides with the end of the compression stroke of exemplary engine 10 (and/or exhaust stroke) and/or the beginning of the power stroke (and/or the intake stroke). Thus, with radial axis RA in this orientation according to some embodiments, piston 16 is at its upper position within cylinder 14, in particular, piston 16 is at the top of its stroke while the radial axis RA of crankshaft 20 is substantially aligned with the longitudinal axis CR of connecting rod 28.

According to some embodiments, engine 10 may be configured such that piston 16 continues to travel in cylinder 14 in a direction away from crankshaft 20, even as radial axis RA passes first stroke termination angle θ₁, such that reversal of direction of piston 16 in cylinder 14 is delayed.

Figure 8:
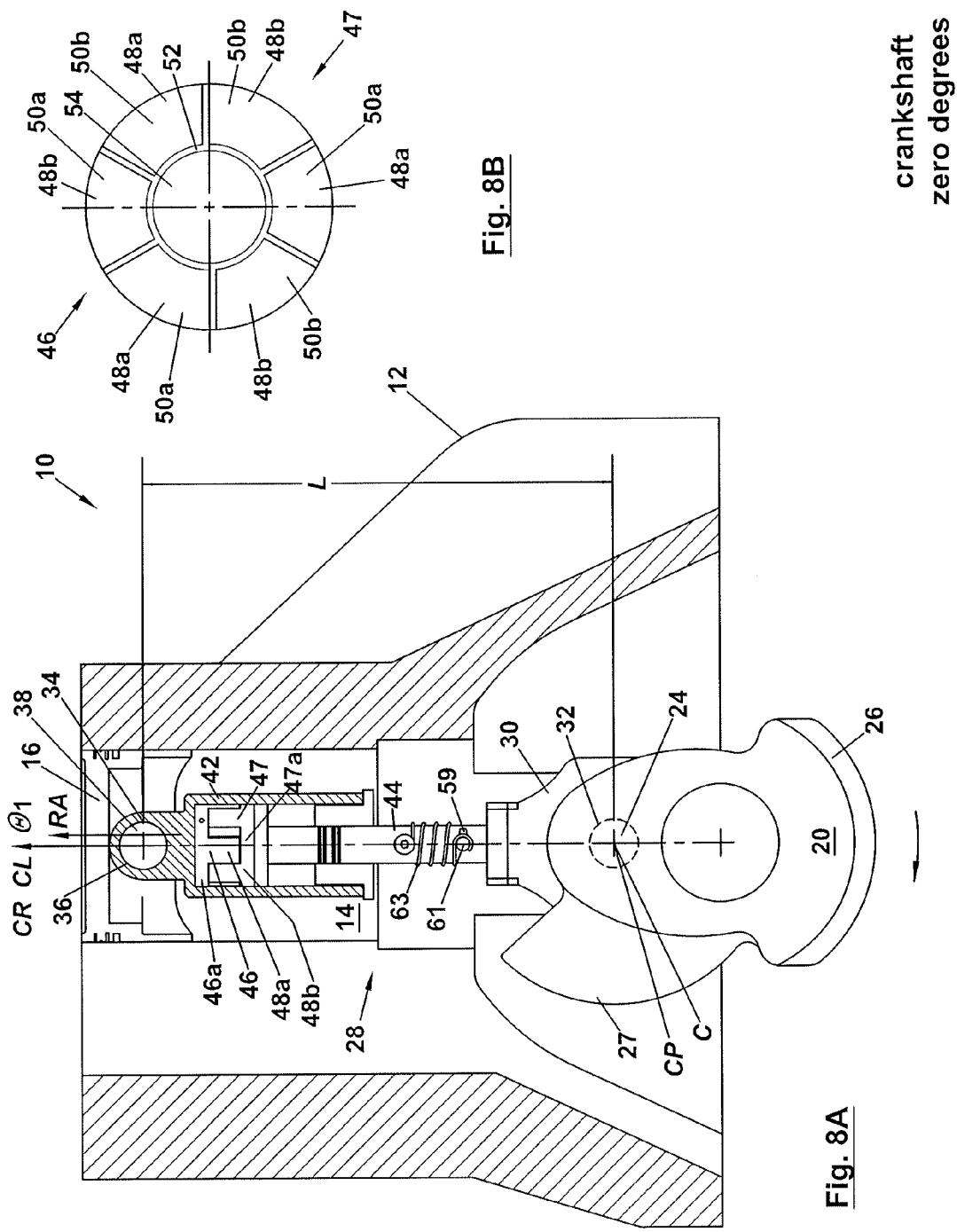
FIG. 8A is a schematic partial end section view of the exemplary embodiment shown in FIG. 7 with the radial axis angle of the crankshaft shown at 0 degrees.
FIG. 8B is a schematic partial top detail view an exemplary portion of the exemplary embodiment shown in FIG. 8A.
Figure 9:
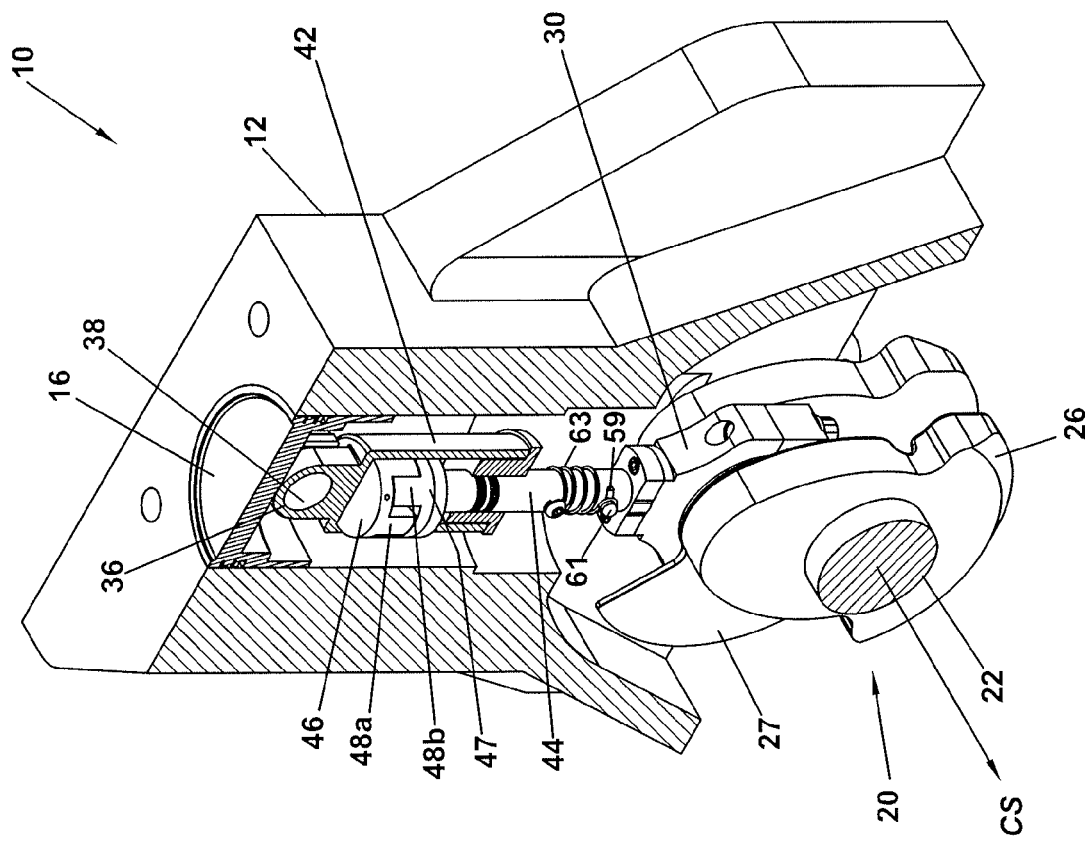
FIG. 9 is a schematic partial perspective section view of the exemplary embodiment shown in FIG. 1 with the radial axis angle of the crankshaft shown at 0 degrees.

As shown in FIGS. 8A-16, during operation of engine 10 crankshaft 20 rotates in the clockwise direction. As shown in FIGS. 8A-10, rod portion 44 of connecting rod 28 is in its retracted position in sleeve portion 42. Thus, the effective length L of connecting rod 28 is in it shortest condition. As shown in FIG. 8A, projections 48a and 48b of end cap 46 and plunger 47, respectively, are meshed with one another, with rod portion 44 in a first angular position with respect to sleeve portion 42 such that plunger 47 is in a first angular position with respect to end cap 46. Resilient member 54 is in a compressed state in cavity 52, which has a relatively reduced volume by virtue of opposing bases 46a and 47a of end cap 46 and plunger 47 being close to one another.

As shown in FIGS. 11A and 11B, crankshaft 20 has rotated clockwise, so that radial axis RA has rotated 36 degrees past first stroke termination angle θ₁. In a conventional engine, piston 16 would have traveled a significant distance toward crankshaft axis CS with the crankshaft 20 at this radial position. In contrast, according to exemplary engine 10, piston 16 has not yet started its downward travel toward crankshaft axis CS. Instead, rod portion 44 of connecting rod 28 has moved from its retracted position in sleeve portion 42 to an extended position. Thus, the effective length L of connecting rod 28 is in its longest condition. Resilient member 54 has expanded in cavity 52 to push opposing bases 46a and 47a of end cap 46 and plunger 47 farther apart, thereby expanding cavity 52. As a result, projections 48a and 48b of end cap 46 and plunger 47, respectively, are no longer meshed with one another. Rather, end faces 50a and 50b of projections 48a and 48b of end cap 46 and plunger 47, respectively, have cleared one another. Thus, instead of piston 16 traveling down cylinder 14 as crankpin 24 draws away from cylinder 14, rod portion 44 has extended from its retracted position to substantially offset the effect of the movement of crankpin 24. (See the Table below showing an exemplary relationship for exemplary engine 10 between radial axis RA's angle and piston 16's displacement relative to the first stroke termination angle θ₁)

TABLE

RADIAL AXIS RA ANGLE VS. PISTON DISPLACEMENT RELATIVE TO ZERO DEGREES FOR FIGS. 1-16

| Crank Angle | Piston Depth | Crank Angle | Piston Depth |
| --- | --- | --- | --- |
| 0 | 0.000 | 92 | 1.685 |
| 4 | 0.000 | 96 | 1.819 |
| 8 | 0.000 | 100 | 1.949 |
| 12 | 0.000 | 104 | 2.076 |
| 16 | 0.000 | 108 | 2.199 |
| 20 | 0.000 | 112 | 2.317 |
| 24 | 0.000 | 116 | 2.431 |
| 28 | 0.000 | 120 | 2.539 |
| 32 | 0.000 | 124 | 2.641 |
| 36 | 0.000 | 128 | 2.737 |
| 40 | 0.000 | 132 | 2.826 |
| 44 | 0.106 | 136 | 2.909 |
| 48 | 0.218 | 140 | 2.986 |
| 52 | 0.337 | 144 | 3.055 |
| 56 | 0.461 | 148 | 3.118 |
| 60 | 0.590 | 152 | 3.173 |
| 64 | 0.722 | 156 | 3.221 |
| 68 | 0.857 | 160 | 3.262 |
| 72 | 0.995 | 164 | 3.296 |
| 76 | 1.133 | 168 | 3.322 |
| 80 | 1.272 | 172 | 3.340 |
| 84 | 1.411 | 176 | 3.351 |
| 88 | 1.549 | 180 | 3.364 |

In addition, actuating cam 27 of crankshaft 20 approaches follower 61 of connecting rod 28. However, actuating cam 27 has not engaged follower 51, and thus, rod portion 44 remains in its first angular position relative to sleeve portion 42, such that although projections 48a and 48b are no longer meshed with one another, they remain substantially misaligned.

Figures 12A, 12B:
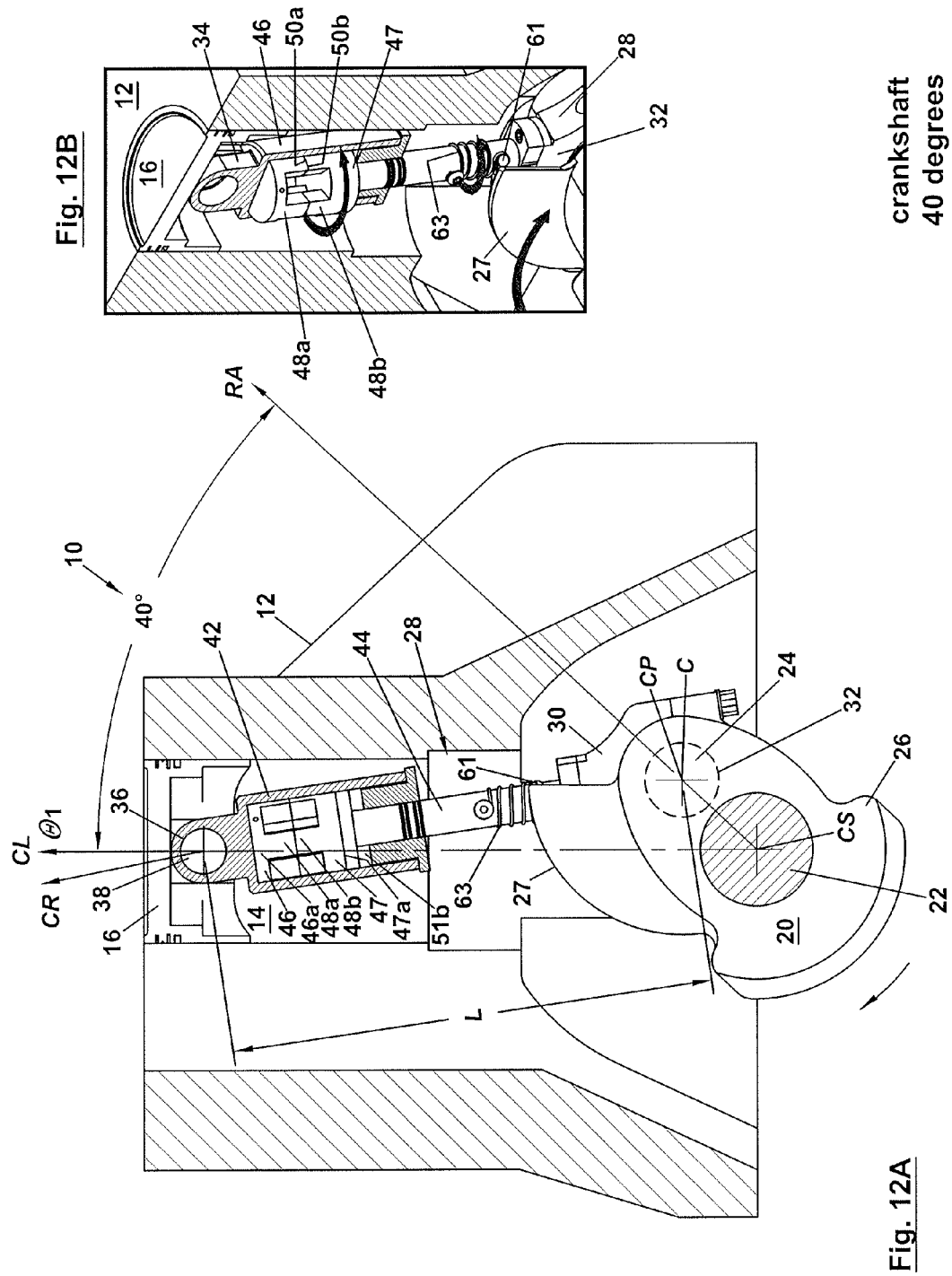
FIG. 12A is a schematic partial end section view of the exemplary embodiment shown in FIG. 1 with the radial axis angle of the crankshaft shown at 40 degrees.
FIG. 12B is a schematic partial perspective detail section view of FIG. 12A.

As shown in FIGS. 12A and 12B, crankshaft 20 continues to rotate from the position shown in FIGS. 11A and 11B to an orientation where radial axis RA has rotated 40 degrees past first stroke termination angle θ₁. Piston 16 continues to maintain its position in cylinder 14 and has not yet started its downward travel toward crankshaft axis CS. Rod portion 44 of connecting rod 28 continues to be in its extended position relative to sleeve portion 42. Opposing bases 46a and 47a of end cap 46 and plunger 47 remain spread apart, such that cavity 52 remains in its expanded state. Thus, the effective length L of connecting rod 28 remains in its longest condition. Projections 48a and 48b remain in an un-meshed state.

However, as shown in FIGS. 12A and 12B, actuating cam 27 of crankshaft 20 has engaged follower 61 of connecting rod 28, thereby causing rod portion 44 to rotate from its first angular position with respect to sleeve portion 42 toward its second angular position. As actuating cam 27 engages follower 61, follower 61 moves within slot 59, thus twisting inner portion 49 within outer portion 51, such that projections 48a and 48b become at least partially aligned with one another, and end faces 50a and 50b of end cap 46 and plunger 47, respectively, can abut one another.

Combustion may begin at this point. By virtue of end faces 50a and 50b abutting one another, the effective length L of connecting rod 28 is maintained in its extended configuration rather than allowing cavity 52 to collapse back to its reduced volume as combustion forces piston 16 down cylinder 14. As a result, force from combustion is transferred to crankpin 24, thereby driving crankshaft 20 in a clockwise direction, as shown.

Although the exemplary embodiment shown in FIGS. 8A-16 shows the point at which piston 16 begins to move from its point of maximum stroke to be where radial axis RA has rotated 40 degrees past first stroke termination angle θ₁, this point may be between 40 and 60 degrees past first stroke termination angle θ₁ (e.g., 59 degrees, 55 degrees, 50 degrees, 45 degrees, or 41 degrees). According to some embodiments, the radial position of radial axis RA at which the piston 16 begins its downward travel in cylinder 14 may be adjusted during operation according to predetermined criteria in order to tailor operation of engine 10.

Figure 13:
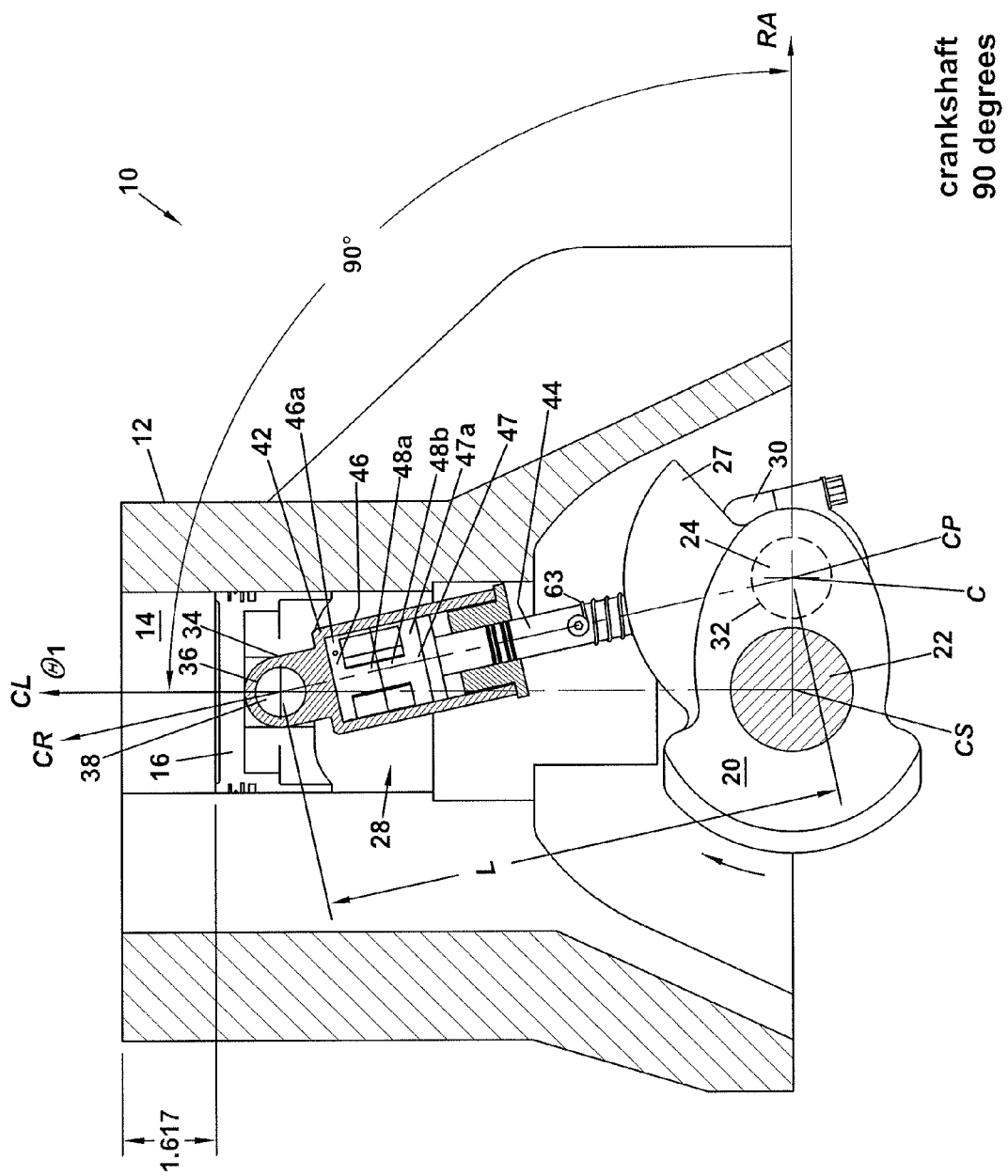
FIG. 13 is a schematic partial end section view of the exemplary embodiment shown in FIG. 1 with the radial axis angle of the crankshaft shown at 90 degrees.
Figure 14:
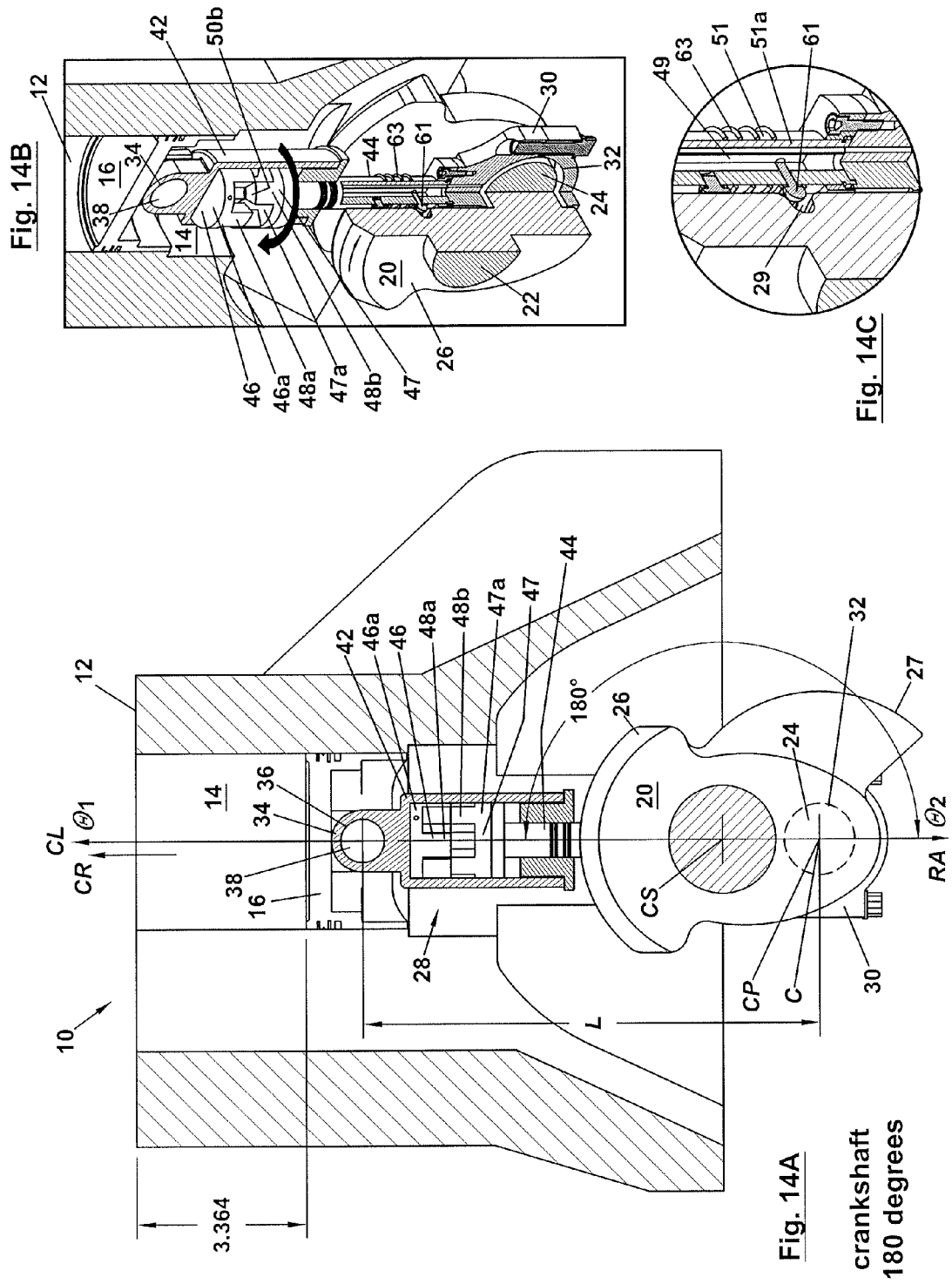
FIG. 14A is a schematic partial end section view of the exemplary embodiment shown in FIG. 1 with the radial axis angle of the crankshaft shown at 180 degrees.
FIG. 14B is a schematic partial perspective detail section view of FIG. 14A.
FIG. 14C is a schematic partial perspective detail section view of FIG. 14B.

Referring to FIG. 13, when the radial axis RA has rotated to 90 degrees past the first stroke termination angle θ₁, piston 16 has traveled 1.617 inches down cylinder 14 relative to its point of maximum extension from crankshaft axis CR. In the exemplary embodiment shown, actuating cam 27 continues to engage follower 61, and thus, projections 48a and 48b of end cap 46 and plunger 47 continue to be aligned, such that end faces 50a and 50b remain in an abutting relationship. Thus, as combustion continues to drive piston 16 down cylinder 14, the force of the combustion is transferred to crankpin 24. Opposing bases 46a and 47a of end cap 46 and plunger 47 remain spread apart, such that cavity 52 maintains its expanded state. Thus, connecting rod 28 maintains its long effective length L.

Referring to FIGS. 14A-14C, radial axis RA has rotated 180 degrees past first stroke termination angle $\theta_1$ (i.e., at a second stroke termination angle $\theta_2$, which corresponds to the end of the power stroke). Combustion has continued to drive piston 16 down cylinder 14, with the force of the combustion continuing to be transferred to crankpin 24. Connecting rod 28 has maintained its long effective length L, and opposing bases 46a and 47a of end cap 46 and plunger 47 have remained spread apart, such that cavity 52 has maintained its expanded state. Thus, in the illustrated example, piston 16 has traveled 3.364 inches down cylinder 14 relative to its point of maximum extension from crankshaft axis CR.

However, in contrast to the condition shown in FIG. 13, as radial axis RA reaches this point, actuating cam 27 disengages follower 61. As a result, radial biasing member 63 forces follower 61 to return to the position shown in FIGS. 8A-11B. When follower 61 returns to this position (see FIGS. 14B and 14C), inner portion 49 of rod portion 44 twists within outer portion 51, resulting in rod portion 44 returning to its first angular position with respect to sleeve portion 42, with projections 48a and 48b returning to their misaligned orientation. As a result, end faces 50a and 50b no longer abut one another. As combustion ends, resilient member 54 continues to hold apart opposing bases 46a and 47a of end cap 46 and plunger 47, such that cavity 52 maintains its expanded state.

As shown in FIGS. 14A and 14B, clearance channel 29 in counterbalance weight 26 of crankshaft 20 provides clearance between counterbalance weight 26 and follower 61. As a result, counterbalance 26 does not engage follower 61, and radial biasing member 63 is permitted to return rod portion 44 to its first angular position relative to sleeve portion 42.

Figure 15:
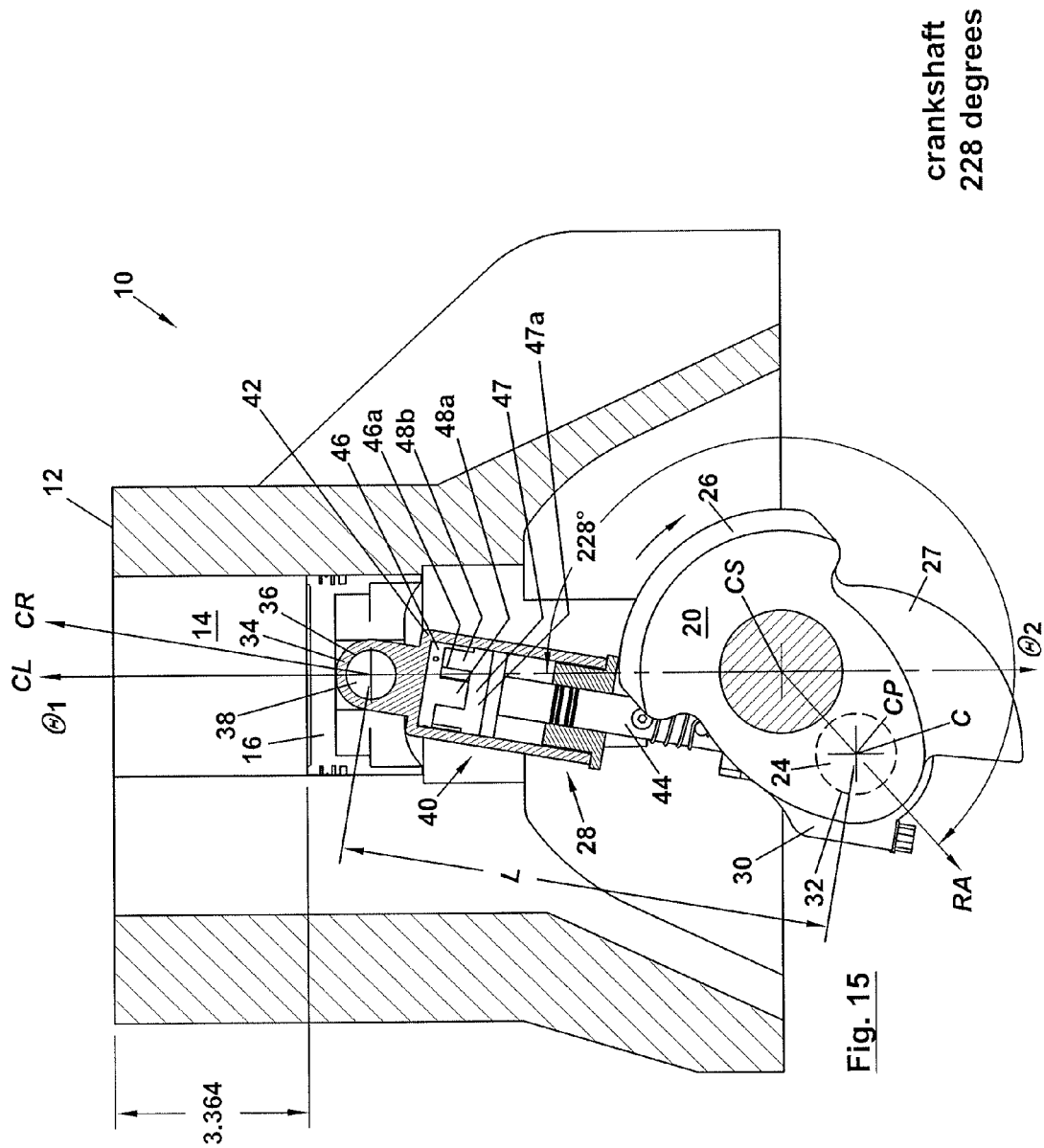
FIG. 15 is a schematic partial end section view of the exemplary embodiment shown in FIG. 1 with the radial axis angle of the crankshaft shown at 228 degrees.

Referring to FIG. 15, radial axis RA has rotated 228 degrees past first stroke termination angle $\theta_1$. Thus, crankpin 24's center C has reversed its vertical direction as shown, such that it is becoming closer to cylinder 14. However, piston 16 has not started to travel up cylinder 14 because the effective length L of connecting rod 28 has shortened to offset upward movement of crankpin 24's center C. With rod portion 44 in its first angular position with respect to sleeve portion 42 and with projections 48a and 48b being misaligned, the effective length L of connecting rod 28 has returned to a shortened length, with projections 48a and 48b returning to a meshed condition. Shortening of the effective length L of connecting rod 28 may be accomplished passively due to inherent resistance within cylinder 14 as crankpin 24 drives connecting rod 28 back up into cylinder 14. According to some embodiments, shortening of the effective length L may be completed when the radial axis RA reaches a radial position of 360 degrees (see FIG. 16), where piston 16 abuts cylinder head 13.

As a result of the shortening of the effective length L of connecting rod 28, piston 16 may remain in substantially the same position within cylinder 14 as the position shown in FIGS. 14A-14C (e.g., at 3.364 inches from its point of maximum extension from crankshaft axis CR), when the radial position of the radial axis RA was at the second stroke termination angle $\theta_2$ (i.e., at 180 degrees past first stroke termination angle $\theta_1$).

Figure 16:
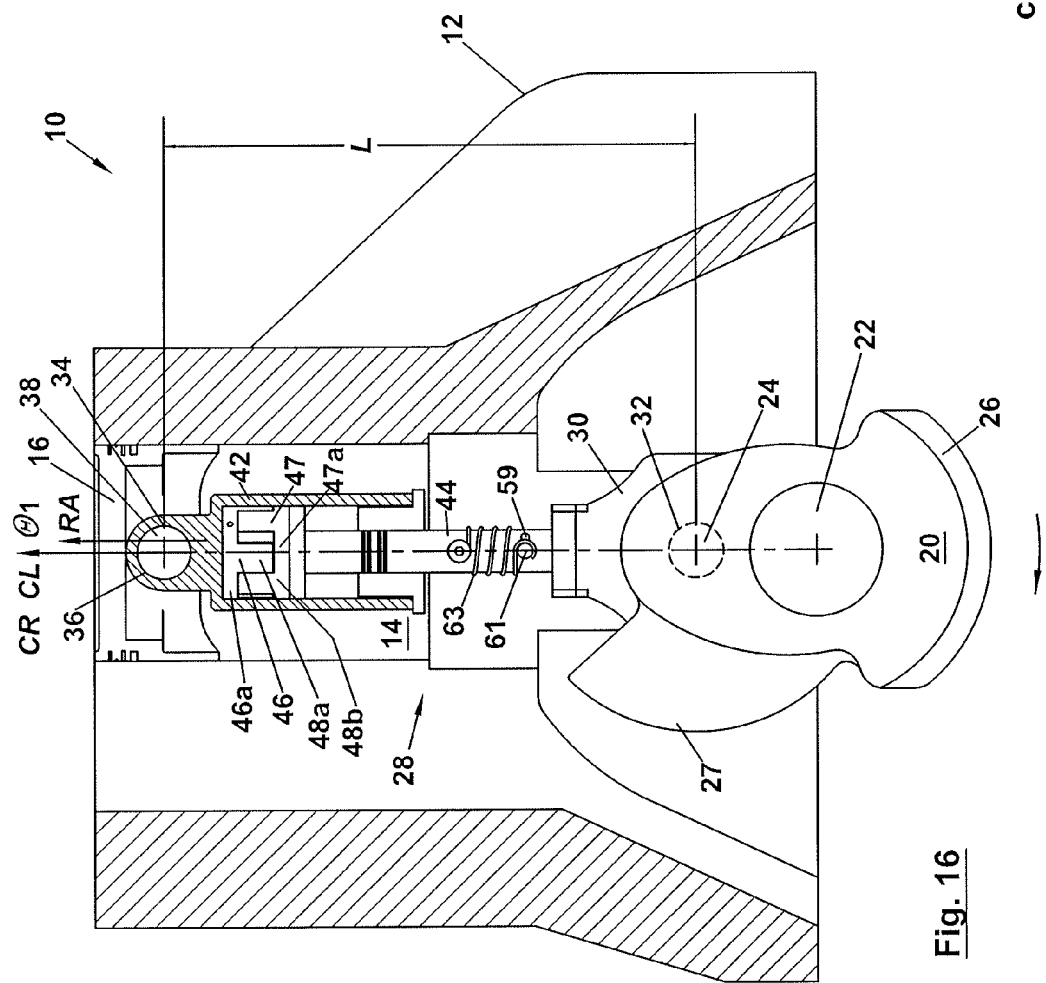
FIG. 16 is a schematic partial end section view of the exemplary embodiment shown in FIG. 1 with the radial axis angle of the crankshaft shown at 0/360 degrees.

Referring to FIG. 16, radial axis RA has rotated 360 degrees past first stroke termination angle $\theta_1$, thus completing a full revolution such that radial axis RA is aligned with cylinder axis CL in the exemplary embodiment shown. Rod portion 44 and sleeve portion 42 of connecting rod 28 have maintained the relative positions shown in FIG. 15. Thus, the effective length L of connecting rod 28 has remained in its shortest condition. As a result, piston 16 has continued to travel up cylinder 14, such that piston 16 has returned to its point of maximum upward travel relative to crankshaft axis CR (i.e., its upper position within cylinder 14).

As mentioned above, according to some embodiments, shortening of the effective length L of connecting rod 28 may be completed as the radial axis RA approaches the radial position shown in FIG. 16, and an upper surface of piston 16 abuts cylinder head 13, thereby compressing rod portion 44 into sleeve portion 42 so that it returns to its retracted position in sleeve portion 42. Cylinder head 13 may include a damper configured to absorb at least a portion of any impact between piston 16 and cylinder head 13, such as, for example, at least one of a spring, a damping material, and a hydraulic damper (not shown). For example, such a damper may include a portion formed from an impact-resistant material, such as high-strength, impact-resistant tool steel, or any other suitable material known to those skilled in the art.

According to some embodiments, cylinder block 12 may have a greater distance d (see FIG. 2) between the bearings that support crankshaft 20 and the upper (or remote) end of cylinders 14 relative to a conventional cylinder block of corresponding configuration. As crankshaft 20 rotates through positions that result in crankpins 24 being laterally offset from the axes CL of cylinders 14, connecting rod 28 is subjected to increased bending stress. By increasing the distance d, the magnitude of the bending stress on connecting rod 28 may be reduced as crankshaft 20 rotates through positions resulting in bending stress in connecting rod 28. This may serve to increase the durability and/or service life of connecting rod 28.

In the exemplary manner described above, the effective length L of connecting rod 28 is variable, such that the distance between the center of pin 38, which operably couples connecting rod 28 to piston 16, and the center C of crankpin 24 is variable. More specifically, the distance between the center of first aperture 32 and the center of second aperture 36 is variable (see, e.g., FIGS. 8A-16), the variability of the effective length L being facilitated in the exemplary embodiment by virtue of controlled extension and retraction of rod portion 44 relative to sleeve portion 42. As radial axis RA rotates between first stroke termination angle $\theta_1$ and 180 degrees past first stroke termination angle $\theta_1$ (i.e., to second stroke termination angle $\theta_2$), the effective length L initially increases, thereby delaying initiation of the power stroke, for example, until radial axis RA reaches a point, for example, at least 40 degrees past first stroke termination angle $\theta_1$ in the exemplary embodiment shown. Timing of the initiation of combustion may be tailored to take advantage of this delay. Thereafter, the effective length L remains substantially constant as radial axis RA continues to rotate toward an orientation 180 degrees past first stroke termination angle $\theta_1$. As the radial axis RA rotates between 180 and 360 degrees past first stroke termination angle $\theta_1$, the effective length L is reduced as rod portion 44 retracts into sleeve portion 42 of connecting rod 28.

According to some embodiments, the exemplary configuration and/or interaction can be tailored to achieve desired performance characteristics of exemplary engine 10, such as, for example, improved efficiency, improved power output, improved responsiveness, and/or improved torque. For example, the extension and retraction of rod portion 44 relative to sleeve portion 42 may be controlled to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries and/or flywheels) operably coupled to the generator and configured to store electrical power and/or kinetic energy. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A connecting rod for an engine, the connecting rod comprising:
   a sleeve portion having a distal end comprising a distal aperture configured to be coupled to a piston;
   a rod portion having a proximal end comprising a proximal aperture configured to be coupled to a crankshaft, the rod portion being received by the sleeve portion and configured to reciprocate in the sleeve portion;
   a resilient member confined between the rod portion and the sleeve portion, the resilient member being configured to be compressed and expanded, such that the rod portion reciprocates in the sleeve portion and a distance between a center of the proximal aperture and a center of the distal aperture is variable;
   an end cap associated with the sleeve portion; and
   a plunger associated with the rod portion,
   wherein the resilient member is confined between the end cap and the plunger,
   wherein the end cap comprises first projections and the plunger comprises second projections, and
   wherein the first and second projections are meshed with one another when the plunger is in a retracted position with respect to the sleeve portion, and the first and second projections are not meshed with one another when the plunger is in an extended position with respect to the sleeve portion.

2. The connecting rod of claim 1, wherein the plunger is configured to rotate relative to the end cap along a longitudinal axis of the plunger, such that the first and second projections are at least partially aligned with one another and prevent retraction of the plunger.

3. The connecting rod of claim 2, wherein the first projections comprise first end faces and the second projections comprise second end faces, and wherein the end cap and the plunger are configured such that the first and second end faces abut one another when the first and second projections are at least partially aligned with one another, thereby preventing retraction of the plunger in the sleeve portion.

4. A connecting rod for an engine, the connecting rod comprising:
   a sleeve portion having a distal end comprising a distal aperture configured to be coupled to a piston;
   a rod portion having a proximal end comprising a proximal aperture configured to be coupled to a crankshaft, the rod portion being received by the sleeve portion and configured to reciprocate in the sleeve portion;
   a resilient member confined between the rod portion and the sleeve portion, the resilient member being configured to be compressed and expanded, such that the rod portion reciprocates in the sleeve portion and a distance between a center of the proximal aperture and a center of the distal aperture is variable;
   an end cap associated with the sleeve portion;
   a plunger associated with the rod portion, wherein the resilient member is confined between the end cap and the plunger; and
   a follower,
   wherein the connecting rod is configured such that movement of the follower causes the plunger to rotate relative to the end cap.

5. The connecting rod of claim 4, further comprising a biasing member associated with the rod portion, wherein the biasing member is configured to bias the plunger toward a first angular position and to return the plunger to the first angular position from a second angular position.

6. The connecting rod of claim 5, wherein the end cap comprises first projections and the plunger comprises second projections, and in the first angular position the first projections of the end cap and the second projections of the plunger mesh with one another, and in the second angular position the first projections of the end cap and the second projections of the plunger are at least partially aligned with one another.

7. A connecting rod for an engine, the connecting rod comprising:
   a sleeve portion having a distal end configured to be coupled to a piston; and a rod portion having a proximal end configured to be coupled to a crankshaft, the rod portion being received by the sleeve portion and configured to reciprocate in the sleeve portion, wherein the rod portion is configured to rotate about a longitudinal axis of the rod portion with respect to the sleeve portion between a first angular position relative to the longitudinal axis of the rod portion and a second angular position relative to the longitudinal axis of the rod portion, and wherein when the rod portion is in the first angular position, the connecting rod has a first length, and when the rod portion is in the second angular position, the connecting rod has a second length longer than the first length.

8. The connecting rod of claim 7, further comprising a resilient member confined between the rod portion and the sleeve portion, the resilient member being configured to be compressed and expanded as the rod portion reciprocates in the sleeve portion.

9. The connecting rod of claim 8, further comprising an end cap associated with the sleeve portion and a plunger associated with the rod portion, wherein the resilient member is confined between the end cap and the plunger.

10. The connecting rod of claim 9, wherein the end cap comprises first projections and the plunger comprises second projections, wherein the first and second projections are meshed with one another when the rod portion is in the first angular position with respect to the sleeve portion, and the first and second projections are not meshed with one another when the rod portion is in the second angular position with respect to the sleeve portion.

11. The connecting rod of claim 10, wherein when the rod portion is in the second angular position, the first and second projections are at least partially aligned with one another and prevent the rod portion from retracting in the sleeve portion.

12. The connecting rod of claim 10, wherein the first projections comprise first end faces and the second projections comprise second end faces, and wherein the end cap and the plunger are configured such that the first and second end faces abut one another when the first and second projections are at least partially aligned with one another, thereby preventing retraction of the rod portion in the sleeve portion.

13. The connecting rod of claim 7, further comprising a follower, wherein the connecting rod is configured such that movement of the follower causes the rod portion to rotate relative to the sleeve portion.

14. The connecting rod of claim 7, further comprising a biasing member associated with the rod portion, wherein the biasing member is configured to bias the rod portion toward the first angular position and to return the rod portion to the first angular position from the second angular position.

15. The connecting rod of claim 7, wherein the sleeve portion comprises first projections and the rod portion comprises second projections, and in the first angular position the first projections of the sleeve portion and the second projections of the rod portion mesh with one another, and in the second angular position the first projections of the sleeve portion and the second projections of the rod portion are at least partially aligned with one another.

16. A connecting rod for an engine, the connecting rod comprising:
a sleeve portion having a distal end configured to be coupled to a piston, the sleeve portion comprising first projections; and
a rod portion having a proximal end configured to be coupled to a crankshaft, the rod portion being received by the sleeve portion and configured to reciprocate in the sleeve portion, wherein the rod portion comprises second projections, wherein when the first and second projections mesh with one another, the connecting rod has a first length, and when the first and second projections are not meshed with one another, the connecting rod has a second length longer than the first length.

17. The connecting rod of claim 16, further comprising a resilient member confined between the rod portion and the sleeve portion, the resilient member being configured to be compressed and expanded as the rod portion reciprocates in the sleeve portion.

18. The connecting rod of claim 17, further comprising an end cap associated with the sleeve portion and a plunger associated with the rod portion, wherein the resilient member is confined between the end cap and the plunger.

19. The connecting rod of claim 16, wherein the sleeve portion and the rod portion are configured such that the rod portion rotates within the sleeve portion between a first angular position relative to a longitudinal axis of the rod portion and a second angular position relative to the longitudinal axis of the rod portion, wherein the first and second projections are meshed with one another when the rod portion is in the first angular position, and the first and second projections are not meshed with one another when the rod portion is in the second angular position.

20. The connecting rod of claim 19, wherein when the rod portion is in the second angular position, the first and second projections are at least partially aligned with one another and prevent the rod portion from retracting in the sleeve portion.

21. The connecting rod of claim 19, further comprising a biasing member associated with the rod portion, wherein the biasing member is configured to bias the rod portion toward the first angular position and to return the rod portion to the first angular position from the second angular position.

22. The connecting rod of claim 16, wherein the first projections comprise first end faces and the second projections comprise second end faces, and wherein the sleeve portion and the rod portion are configured such that the first and second end faces abut one another when the first and second projections are at least partially aligned with one another, thereby preventing retraction of the rod portion in the sleeve portion.

23. The connecting rod of claim 16, further comprising a follower, wherein the connecting rod is configured such that movement of the follower causes the rod portion to rotate relative to the sleeve portion.

24. An internal combustion engine comprising:
a cylinder block defining a cylinder;
a crankshaft defining a crankpin, wherein the crankshaft is rotatably coupled to the cylinder block and rotates along a longitudinal crankshaft axis, and the crankpin defines a longitudinal crankpin axis parallel to and offset by a distance with respect to the longitudinal crankshaft axis;
a piston configured to reciprocate within the cylinder, and
a connecting rod coupled to the piston and the crankpin, wherein the connecting rod comprises:
a sleeve portion having a distal end coupled to the piston, and
a rod portion having a proximal end coupled to the crankpin, the rod portion being received by the sleeve portion and configured to reciprocate in the sleeve portion,
a resilient member confined between the rod portion and the sleeve portion, the resilient member being configured to be compressed and expanded, such that the rod portion reciprocates in the sleeve portion and a distance between a cross-sectional center of the crankpin and an upper surface of the piston is variable,
an end cap associated with the sleeve portion, and
a plunger associated with the rod portion,
wherein the resilient member is confined between the end cap and the plunger, and the end cap and the plunger are configured to selectively control reciprocation of the rod portion in the sleeve portion,
wherein the end cap comprises first projections and the plunger comprises second projections, and
wherein the first and second projections are meshed with one another when the plunger is in a retracted position, and the first and second projections are not meshed with one another when the plunger is in an extended position.

25. The engine of claim 24, wherein the plunger is configured to rotate relative to the end cap along a longitudinal axis of the plunger, such that the first and second projections are at least partially aligned with one another and prevent retraction of the plunger.

26. The engine of claim 25, wherein the first projections comprise first end faces and the second projections comprise second end faces, wherein the end cap and the plunger are configured such that the first and second end faces abut one another when the first and second projections are at least partially aligned with one another, thereby preventing retraction of the plunger.

27. The engine of claim 25, wherein a line extending between the longitudinal crankshaft axis and the longitudinal crankpin axis defines a radial axis of the crankshaft, and wherein the connecting rod is configured such that the plunger rotates with respect to the end cap based on a radial position of the radial axis of the crankshaft.

28. The engine of claim 27, wherein the crankshaft comprises at least one actuating cam configured to rotate the plunger with respect to the end cap.

29. The engine of claim 28, further comprising a follower associated with the connecting rod, wherein the actuating cam and follower are configured such that the actuating cam moves the follower and rotates the plunger relative to the end cap.

30. The engine of claim 29, wherein the at least one actuating cam comprises a wing extending radially from the crankpin.

31. The engine of claim 29, wherein the crankshaft comprises at least one counterbalance weight, wherein the at least one counterbalance weight defines a clearance passage configured such that the follower is not engaged by the counterbalance weight.

32. The engine of claim 29, further comprising a biasing member associated with the rod portion, wherein the biasing member is configured to bias the plunger toward a first angular position and to return the plunger to the first angular position from a second angular position.

33. The engine of claim 32, wherein in the first angular position, the first projections of the end cap and the second projections of the plunger mesh with one another, and in the second angular position, the first end faces of the end cap and the second end faces of the plunger are at least partially aligned with one another.

34. A power train comprising:
the engine according to claim 24;
a transmission coupled to the engine; and
a drive member configured to perform work, the drive member being coupled to the transmission.

35. The power train of claim 34, wherein the drive member comprises a propulsion device.

36. The power train of claim 35, wherein the propulsion device comprises at least one of a wheel and a propeller.

37. The power train of claim 34, further comprising:
a generator configured to convert rotational power into electrical power, the generator being coupled to the engine; and
a power storage device configured to store electrical power, the power storage device being coupled to the generator,
wherein the transmission comprises an electric motor.

38. A vehicle comprising:
the engine according to claim 24;
a transmission coupled to the engine; and
a drive member configured to perform work, the drive member being coupled to the transmission.

39. The vehicle of claim 38, wherein the drive member comprises a propulsion device.

40. The vehicle of claim 39, wherein the propulsion device comprises at least one of a wheel and a propeller.

41. The vehicle of claim 38, further comprising:
a generator configured to convert rotational power into electrical power, the generator being coupled to the engine; and
a power storage device configured to store electrical power, the power storage device being coupled to the generator,
wherein the transmission comprises an electric motor.

42. The vehicle of claim 38, wherein the vehicle comprises one of a car, van, truck, boat, ship, train, and air vehicle.

43. An internal combustion engine comprising:
a cylinder block defining a cylinder;
a crankshaft defining a crankpin, wherein the crankshaft is rotatably coupled to the cylinder block and rotates along a longitudinal crankshaft axis, and the crankpin defines a longitudinal crankpin axis parallel to and offset by a distance with respect to the longitudinal crankshaft axis;
a piston configured to reciprocate within the cylinder;
a connecting rod coupled to the piston and the crankpin, wherein the connecting rod comprises:
a sleeve portion having a distal end coupled to the piston, and
a rod portion having a proximal end coupled to the crankpin, the rod portion being received by the sleeve portion and configured to reciprocate in the sleeve portion, and
a resilient member confined between the rod portion and the sleeve portion, the resilient member being configured to be compressed and expanded, such that the rod portion reciprocates in the sleeve portion and a distance between a cross-sectional center of the crankpin and an upper surface of the piston is variable: and
a cylinder head coupled to the cylinder block,
wherein the cylinder head is configured such that interaction between the piston and the cylinder head compresses the resilient member.

44. The engine of claim 43, wherein the cylinder head comprises a damper configured to absorb at least a portion of impact between the piston and the cylinder head, and wherein the damper comprises at least one of a spring, a damping material, and a hydraulic damper.

45. An internal combustion engine comprising:
a cylinder block defining a cylinder;
a crankshaft defining a crankpin, wherein the crankshaft is rotatably coupled to the cylinder block and rotates along a longitudinal crankshaft axis, and the crankpin defines a longitudinal crankpin axis parallel to and offset by a distance with respect to the longitudinal crankshaft axis;

a piston configured to reciprocate within the cylinder between spaced stroke termination points defining a stroke of the piston; and a connecting rod coupled to the piston and the crankpin, wherein the connecting rod comprises:

a sleeve portion having a distal end coupled to the piston, the sleeve portion comprising first projections, and a rod portion having a proximal end coupled to the crankpin, the rod portion being received by the sleeve portion and configured to reciprocate in the sleeve portion, wherein the rod portion comprises second projections, wherein when the first and second projections mesh with one another, the connecting rod has a first length, and when the first and second projections are not meshed with one another, the connecting rod has a second length longer than the first length, wherein a line extending between the longitudinal crankshaft axis and the longitudinal crankpin axis defines a radial axis of the crankshaft, and wherein the engine is configured such that as the crankshaft rotates, reversal of the direction of travel of the piston within the cylinder is delayed via operation of the sleeve portion and the rod portion after the piston reaches at least one of the stroke termination points.

46. The engine of claim 45, wherein the reversal of the direction of travel of the piston within the cylinder is delayed until the radial axis of the crankshaft has rotated at least about 10 degrees past a point corresponding to the at least one stroke termination point.

47. The engine of claim 45, wherein the reversal of the direction of travel of the piston within the cylinder is delayed until the radial axis of the crankshaft has rotated at least about 20 degrees past a point corresponding to the at least one stroke termination point.

48. The engine of claim 45, wherein the reversal of the direction of travel of the piston within the cylinder is delayed until the radial axis of the crankshaft has rotated at least about 30 degrees past a point corresponding to the at least one stroke termination point.

49. The engine of claim 45, wherein the reversal of the direction of travel of the piston within the cylinder is delayed until the radial axis of the crankshaft has rotated at least about 40 degrees past a point corresponding to the at least one stroke termination point.

50. The engine of claim 45, wherein the connecting rod further comprises a resilient member confined between the rod portion and the sleeve portion, the resilient member being configured to be compressed and expanded, such that the rod portion reciprocates in the sleeve portion.

51. An internal combustion engine comprising:
a cylinder block defining a cylinder;

a crankshaft defining a crankpin, wherein the crankshaft is rotatably coupled to the cylinder block and rotates along a longitudinal crankshaft axis, and the crankpin defines a longitudinal crankpin axis parallel to and offset by a distance with respect to the longitudinal crankshaft axis;

a piston configured to reciprocate within the cylinder between spaced stroke termination points defining a stroke of the piston; and a connecting rod coupled to the piston and the crankpin, wherein the connecting rod comprises:

a sleeve portion having a distal end coupled to the piston, and a rod portion having a proximal end coupled to the crankpin, the rod portion being received by the sleeve portion and configured to reciprocate in the sleeve portion, wherein a line extending between the longitudinal crankshaft axis and the longitudinal crankpin axis defines a radial axis of the crankshaft, and wherein the connecting rod is configured such that the rod portion of the connecting rod rotates along a longitudinal axis of the rod portion relative to the sleeve portion based on a radial position of the radial axis of the crankshaft.

52. The engine of claim 51, wherein rotation of the rod portion relative to the sleeve portion is delayed until the radial axis of the crankshaft has rotated at least about 10 degrees past a point corresponding to the at least one stroke termination point.

53. The engine of claim 51, wherein rotation of the rod portion relative to the sleeve portion is delayed until the radial axis of the crankshaft has rotated at least about 20 degrees past a point corresponding to the at least one stroke termination point.

54. The engine of claim 51, wherein rotation of the rod portion relative to the sleeve portion is delayed until the radial axis of the crankshaft has rotated at least about 30 degrees past a point corresponding to the at least one stroke termination point.

55. The engine of claim 51, wherein rotation of the rod portion relative to the sleeve portion is delayed until the radial axis of the crankshaft has rotated at least about 40 degrees past a point corresponding to the at least one stroke termination point.

56. The engine of claim 51, wherein the connecting rod further comprises a resilient member confined between the rod portion and the sleeve portion, the resilient member being configured to be compressed and expanded, such that the rod portion reciprocates in the sleeve portion.

* * * * *